(12) United States Patent
Kandanarachchi

(10) Patent No.: US 12,180,385 B2
(45) Date of Patent: Dec. 31, 2024

(54) SHELF LIFE STABLE AND IMPROVED MASS POLYMERIZABLE POLYCYCLIC-OLEFINIC COMPOSITIONS

(71) Applicant: PROMERUS, LLC, Akron, OH (US)

(72) Inventor: Pramod Kandanarachchi, Akron, OH (US)

(73) Assignee: PROMERYS, LLC, Akron, OH (US)

( * ) Notice: Subject to any disclaimer, the term of this patent is extended or adjusted under 35 U.S.C. 154(b) by 118 days.

(21) Appl. No.: 17/514,579

(22) Filed: Oct. 29, 2021

(65) Prior Publication Data
US 2022/0135832 A1   May 5, 2022

Related U.S. Application Data

(60) Provisional application No. 63/107,522, filed on Oct. 30, 2020.

(51) Int. Cl.
*C09D 165/00*   (2006.01)

(52) U.S. Cl.
CPC ................... *C09D 165/00* (2013.01)

(58) Field of Classification Search
CPC .......... C09D 165/00; C08G 2261/1412; C08G 2261/1414; C08G 2261/144; C08G 2261/148; C08G 2261/3324; C08G 2261/418; C08G 61/08
See application file for complete search history.

(56) References Cited

U.S. PATENT DOCUMENTS

| | | | |
|---|---|---|---|
| 2002/0052454 A1* | 5/2002 | Lipian | C08F 32/00 526/309 |
| 2017/0279048 A1* | 9/2017 | Rhodes | C08F 132/08 |

FOREIGN PATENT DOCUMENTS

| | | |
|---|---|---|
| JP | 2016/037577 A | 3/2016 |
| WO | WO 2000/20472 A1 | 4/2000 |
| WO | WO 2000/34344 A1 | 6/2000 |

(Continued)

OTHER PUBLICATIONS

Written Opinion of the ISA: PCT/US2021/057289, Feb. 25, 2022.

*Primary Examiner* — Robert S Jones, Jr.
*Assistant Examiner* — Jiangtian Xu
(74) *Attorney, Agent, or Firm* — Balaram Gupta

(57) ABSTRACT

Embodiments in accordance with the present invention encompass compositions containing one or more polycyclooolefinic monomers, optionally at least one multifunctional olefinic monomer and a suitable solvent, which exhibits long shelf life stability and undergoes mass polymerization only when subjected to a suitable temperature to provide a three-dimensional insulating articles. Embodiments of this invention exhibit hitherto unattainable properties, such as for example, low dielectric constant and low loss properties, and very high thermal properties, among others. The compositions of this invention may additionally contain one or more organic or inorganic filler materials, which provide improved thermo-mechanical properties in addition to very low dielectric properties. In general the compositions are stable at room temperature for an extended period of time lasting up to a few weeks and undergo mass polymerization only when subjected to suitable higher temperatures generally above 100° C. The compositions of this invention are useful in various applications, including as insulating materials in millimeter wave radar antennas, among others.

14 Claims, 6 Drawing Sheets

(56) References Cited

FOREIGN PATENT DOCUMENTS

| WO | WO 2017/165478 A1 | 9/2017 |
| WO | WO 2020/132665 A1 | 6/2020 |

\* cited by examiner

SHELF LIFE STABLE AND IMPROVED MASS POLYMERIZABLE POLYCYCLIC-OLEFINIC COMPOSITIONS

CROSS REFERENCE TO RELATED APPLICATIONS

This application claims the benefit of U.S. Provisional Application No. 63/107,522, filed Oct. 30, 2020, which is incorporated herein by reference in its entirety.

BACKGROUND OF THE INVENTION

Field of the Invention

Embodiments in accordance with the present invention relate generally to a composition containing one or more polycycloolefinic monomers, organopalladium catalyst, an activator and a solvent. The compositions may optionally include one or more multifunctional olefinic monomers. The compositions are very stable at ambient conditions, thus exhibiting long shelf life stability. However, when the compositions are subjected to a suitable higher temperature undergoes mass polymerization instantaneously to form three-dimensional insulating articles which exhibit hitherto unattainable low dielectric constant and low loss properties, and very high thermal properties. More specifically, this invention relates to a composition containing a series of substituted norbornene derivatives, a solvent and optionally one or more bifunctional monomeric compounds which undergoes mass polymerization in the presence of certain organopalladium compounds to form three-dimensional articles such as for example films, which exhibit very high glass transition temperature, which can be as high as 300° C. or higher, and exhibits low dielectric constant (less than 2.4 at a frequency of 10 GHz) and low-loss properties. Accordingly, the composition of this invention finds applications as insulating materials in a variety of applications including electromechanical devices having applications in the fabrication of a number of automotive parts, among others.

Description of the Art

It is well known in the art that insulating materials having low dielectric constant (Dk) and low-loss (Df) are important in printed circuit boards catering to electrical appliances and automotive parts and other applications. Generally, in most of such devices the insulating materials that are suitable must have dielectric constant lower than 3 and low-loss lesser than 0.002 (or even lesser than 0.001) at high frequencies such as for example greater than 50 GHz. Also, there is an increased interest in developing organic dielectric materials as they are easy to fabricate among other advantages.

However, there are significant technical challenges in developing such insulating materials meeting all of the requirements. One such challenge is that such materials exhibit low coefficient of thermal expansion (CTE), which may be in the range of 50 to 100 ppm/K due to concerns of peeling from copper layers. Another challenge is that such materials exhibit very high glass transition temperature ($T_g$), which is preferably greater than 150° C. or even higher than 250° C. due to the process conditions used in the manufacture of printed circuit boards as well as harsh conditions the devices may encounter, such as for example millimeter-wave Radar antennas used in the automobiles.

Although films made from the addition polymerization of norbornene derivatives containing long side chains, such as for example, 5-hexylnorbornene (HexNB) and 5-decylnorbornene (DecNB) are known to have low Dk and Df due to their hydrophobic nature these films exhibit high CTE (>200 ppm/K) and low $T_g$. See, for example, JP 2016037577A and JP 2012121956A.

It has also been reported in the literature that certain of the polymers, such as for example, fluorinated poly-ethylene, poly-ethylene and poly-styrene feature low Dk/Df but all of such polymers are unsuitable as organic insulating materials as they exhibit very low glass transition temperatures, which can be much lower than 150° C. Further, it has also been reported in the literature that generally low CTE and high $T_g$ polymers can be generated when certain substituted norbornenes substituted with polar groups such as ester or alcohol groups are incorporated. However, incorporation of such groups will increase both Dk and Df due to their polarizability under an electromagnetic field, particularly at high frequencies. Therefore, such polar group substituted norbornenes are unsuitable in forming insulating materials as contemplated herein.

Therefore, there is still a need to develop new insulating materials that exhibit not only low dielectric properties but also very high thermal properties.

Accordingly, it is an object of this invention to provide a composition containing one or more monomers of substituted norbornenes and a multifunctional monomer, which when mass polymerized provides an insulating material having hitherto unattainable properties.

Other objects and further scope of the applicability of the present invention will become apparent from the detailed description that follows.

SUMMARY OF THE INVENTION

Surprisingly, it has now been found that employing a composition containing one or more monomers of formula (I) as described herein, a solvent, an organopalladium compound and an activator (i.e., a co-catalyst), it is now possible to form a three-dimensional object which provides hitherto unattainable dielectric as well as thermal properties, among other property enhancements. In some embodiments, the compositions may further include at least one multi-functional compound of formulae (A1) or (A2) or (A3) as described herein. Accordingly, the compositions of this invention are useful in the fabrication of a variety of electronic, optical and optoelectronic devices. More specifically, the composition of this invention can be used as coating materials, filler materials, and in forming various three-dimensional objects, such as films, and other solid objects.

In another aspect of this invention there is also a provided a kit comprising the composition of this invention.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

DETAILED DESCRIPTION OF THE INVENTION

Figure 1:
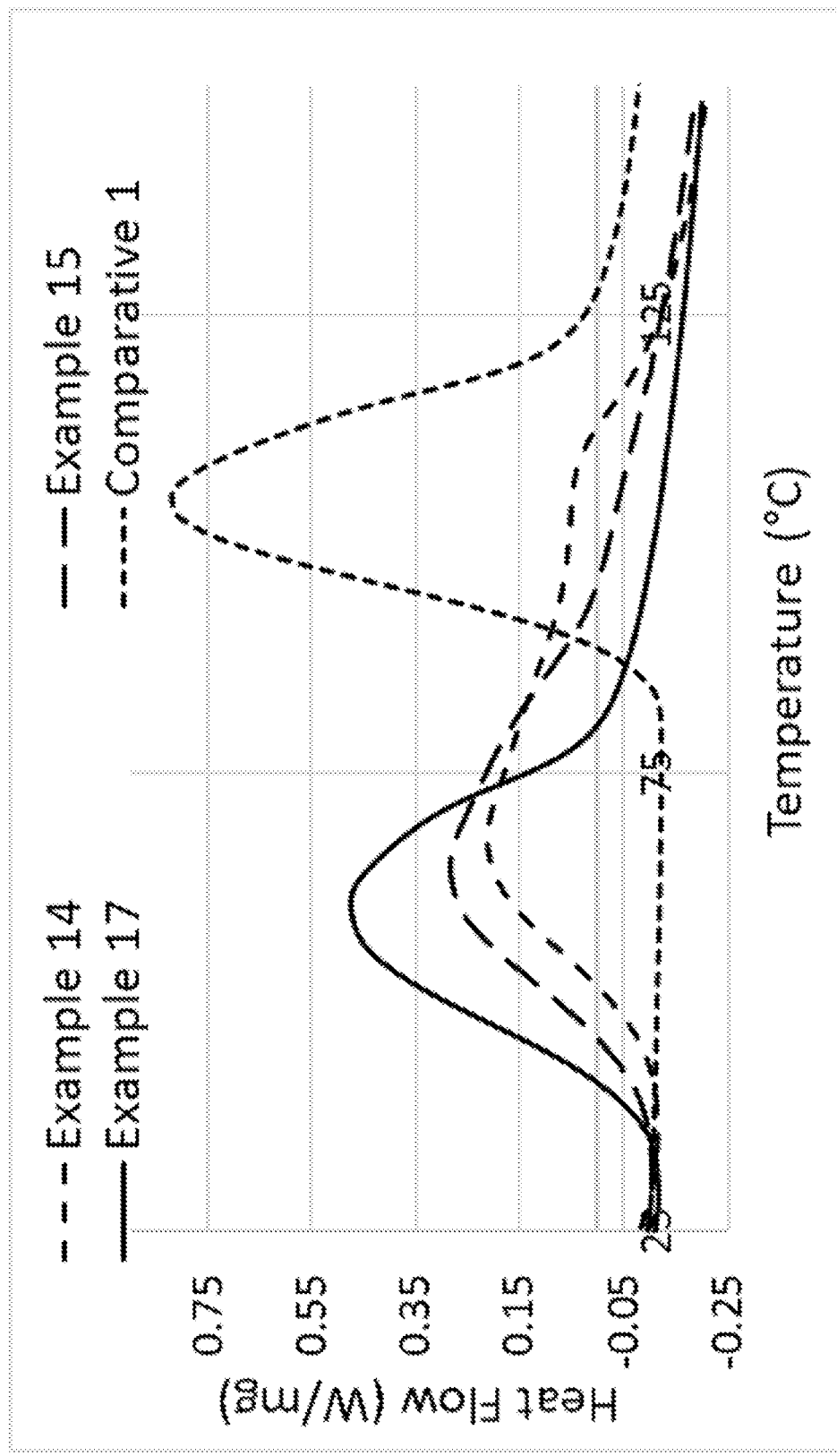
FIG. 1 shows differential scanning calorimetric (DSC) thermograms obtained for various embodiments of this invention using one type of catalyst activator as described herein.

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenyl-alkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl, hexenyl, and the like. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

As used herein, the expression "heterocycle" includes all of the known reduced heteroatom containing cyclic radicals. Representative 5-membered heterocycle radicals include tetrahydrofuranyl, tetrahydrothiophenyl, pyrrolidinyl, 2-thiazolinyl, tetrahydrothiazolyl, tetrahydrooxazolyl, and the like. Representative 6-membered heterocycle radicals include piperidinyl, piperazinyl, morpholinyl, thiomorpholinyl, and the like. Various other heterocycle radicals include, without limitation, aziridinyl, azepanyl, diazepanyl, diazabicyclo[2.2.1]hept-2-yl, and triazocanyl, and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of ($C_1$-$C_6$)alkyl, ($C_2$-$C_6$)alkenyl, ($C_1$-$C_6$)perfluoroalkyl, phenyl, hydroxy, —$CO_2H$, an ester, an amide, ($C_1$-$C_6$)alkoxy, ($C_1$-$C_6$)thioalkyl and ($C_1$-$C_6$)perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

It will be understood that the terms "dielectric" and "insulating" are used interchangeably herein. Thus reference to an insulating material or layer is inclusive of a dielectric material or layer and vice versa. Further, as used herein, the term "organic electronic device" will be understood to be inclusive of the term "organic semiconductor device" and the several specific implementations of such devices used, for example, in automotive industry.

As used herein, the dielectric constant (Dk) of a material is the ratio of the charge stored in an insulating material placed between two metallic plates to the charge that can be stored when the insulating material is replaced by vacuum or air. It is also called as electric permittivity or simply permittivity. And, at times referred as relative permittivity, because it is measured relatively from the permittivity of free space.

As used herein, "low loss" is the dissipation factor (Df) is a measure of loss-rate of energy of a mode of oscillation (mechanical, electrical, or electromechanical) in a dissipative system. It is the reciprocal of quality factor, which represents the "quality" or durability of oscillation.

By the term "derived" is meant that the polymeric repeating units are polymerized (formed) from, for example, polycyclic norbornene-type monomers in accordance with formulae (I) wherein the resulting polymers are formed by 2,3 enchainment of norbornene-type monomers as shown below:

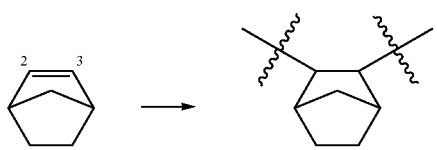

The above polymerization is also known widely as vinyl addition polymerization typically carried out in the presence of organometallic compounds such as organopalladium compounds or organonickel compounds as further described in detail below.

Thus, in accordance with the practice of this invention there is provided a film forming composition comprising:

a) one or more olefinic monomers of the formula (I):

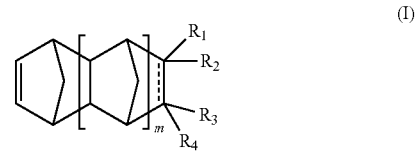

wherein:

m is an integer 0, 1 or 2;

----- is a single bond or a double bond;

$R_1$, $R_2$, $R_3$ and $R_4$ are the same or different and each independently selected from the group consisting of hydrogen, halogen, methyl, ethyl, linear or branched ($C_3$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, epoxy($C_1$-$C_{10}$)alkyl, epoxy($C_1$-$C_{10}$)alkyloxy($C_1$-$C_{10}$)alkyl, epoxy($C_3$-$C_{10}$)cycloalkyl, perfluoro($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy, ($C_6$-$C_{10}$)aryl($C_1$-$C_6$)alkoxy, perfluoro($C_6$-$C_{10}$)aryloxy and perfluoro($C_6$-$C_{10}$)aryl($C_1$-$C_3$)alkoxy, or one of $R_1$ and $R_2$ taken together with one of $R_3$ and $R_4$ and the carbon atoms to which they are attached to form a substituted or unsubstituted ($C_5$-$C_{14}$)cyclic, ($C_5$-$C_{14}$) bicyclic or ($C_5$-$C_{14}$)tricyclic ring optionally containing one or more double bonds;

b) an organopalladium compound selected from the group consisting of:

palladium (II) bis(triphenylphosphine) dichloride;
palladium (II) bis(triphenylphosphine) dibromide;
palladium (II) bis(triphenylphosphine) diacetate;
palladium (II) bis(triphenylphosphine) bis(trifluoroacetate);
palladium (II) bis(tricyclohexylphosphine) dichloride;
palladium (II) bis(tricyclohexylphosphine) dibromide;
palladium (II) bis(tricyclohexylphosphine) diacetate (Pd785);
palladium (II) bis(tricyclohexylphosphine) bis(trifluoroacetate) (Pd893);
palladium (II) bis(tricyclohexylphosphine) bis(triflate) (Pd965);
palladium (II) bis(tri-p-tolylphosphine) dichloride;
palladium (II) bis(tri-p-tolylphosphine) dibromide;
palladium (II) bis(tri-p-tolylphosphine) diacetate;
palladium (II) bis(tri-p-tolylphosphine) bis(trifluoroacetate);
palladium (II) ethyl hexanoate;
dichloro bis(benzonitrile)palladium (II);
platinum (II) chloride;
platinum (II) bromide; and
platinum bis(triphenylphosphine)dichloride; and c) an activator selected from the group consisting of:

lithium tetrafluoroborate;
lithium triflate;
lithium tetrakis(pentafluorophenyl)borate;
lithium tetrakis(pentafluorophenyl)borate etherate (Li-FABA);
sodium tetrakis(pentafluorophenyl)borate etherate (Na-FABA);

trityl tetrakis(pentafluorophenyl)borate etherate (tritylFABA);
tropylium tetrakis(pentafluorophenyl)borate etherate (tropyliumFABA);
lithium tetrakis(pentafluorophenyl)borate isopropanolate;
lithium tetraphenylborate;
lithium tetrakis(3,5-bis(trifluoromethyl)phenyl)borate;
lithium tetrakis(2-fluorophenyl)borate;
lithium tetrakis(3-fluorophenyl)borate;
lithium tetrakis(4-fluorophenyl)borate;
lithium tetrakis(3,5-difluorophenyl)borate;
lithium hexafluorophosphate;
lithium hexaphenylphosphate;
lithium hexakis(pentafluorophenyl)phosphate;
lithium hexafluoroarsenate;
lithium hexaphenylarsenate;
lithium hexakis(pentafluorophenyl)arsenate;
lithium hexakis(3,5-bis(trifluoromethyl)phenyl)arsenate;
lithium hexafluoroantimonate;
lithium hexaphenylantimonate;
lithium hexakis(pentafluorophenyl)antimonate;
lithium hexakis(3,5-bis(trifluoromethyl)phenyl)antimonate;
lithium tetrakis(pentafluorophenyl)aluminate;
lithium tris(nonafluorobiphenyl)fluoroaluminate;
lithium (octyloxy)tris(pentafluorophenyl)aluminate;
lithium tetrakis(3,5-bis(trifluoromethyl)phenyl)aluminate;
lithium methyltris(pentafluorophenyl)aluminate;
dimethylanilinium tetrakis(pentafluorophenyl)borate (DANFABA); and d) a solvent selected from the group consisting of water, o-xylene, p-xylene, m-xylene, benzene, fluorobenzene, 1,2-difluorobenzene, 1,3-difluorobenzene, 1,4-difluorobenzene, 1,2,4-trifluorobenzene, 1,3,5-trifluorobenzene, 1,2,3,4-tetrafluorobenzene, 1,2,4,5-tetrafluorobenzene, pentafluorobenzene, hexafluorobenzene, toluene, ethylbenzene, trifluorotoluene, pentafluoroethylbenzene, chlorobenzene, nitrobenzene, 1,4-dioxane, dimethylacetamide, dimethylformamide, diethylformamide, furan, tetrahydrofuran, diethyl ether, dimethoxyethane, ethyl acetate, propyl acetate, butyl acetate, amyl acetate, acetone, methyl ethyl ketone, cyclopentane, cyclohexane, methylcyclopentane, methylcyclohexane, ethylcyclopentane, ethylcyclohexane, dibromomethane, dichloromethane, chloroform, tetrachloromethane, 1,2-dichloroethane, and a mixture in any combination thereof.

Surprisingly, it has been now found that use of a suitable solvent in the composition of this invention not only facilitates delivery of the catalyst and the activator but also increases the shelf life of the composition. That is, the composition of this invention when prepared with an appropriate solvent keeps the composition stable at ambient temperatures but allows instantaneous mass polymerization of the monomers contained therein as soon as the composition is subjected to temperatures higher than the ambient temperature, such as for example 100° C. or higher than 100° C. In fact this has been one of unsolved problems in the art of mass polymerization compositions where a catalyst inherently had a short shelf life especially when compared with similar solution polymerization conditions because of the fact that the mass polymerization compositions contained high concentration of the monomers and was therefore difficult to control the rate of polymerization both under thermal as well as photo catalytic conditions.

In addition, the loss of monomer mobility as the polymerization progresses leads to entrapment of residual monomer and non-volatile oligomeric components. The non-volatile oligomeric monomers may include dimers, trimers, tetramers, and the like. Such oligomers may also include some low molecular weight crosslinked components, which will impart undesirable properties to the resulting film and/or solid forms of the compositions. Thus, the presence of such low molecular weight residual matter may lead to lower thermal decomposition temperatures, lower glass transition temperatures (perhaps due to plasticization), lower transparency, increased dielectric loss factor, among other adverse properties. This necessitates that compositions are highly reactive and it is imperative that quantitative conversion of the monomers are attained in minutes rather than in hours such as in solution polymerizations.

Even more importantly other problems encountered in the prior art include most of the palladium compounds used as catalysts are polar and do not dissolve or disperse well in most hydrophobic norbornene monomers as exemplified by a variety of monomers of formula (I). This further slows down or inhibits mass polymerization of the monomers of formula (I). Furthermore, the activators or the co-catalysts as described herein, such as for example DANFABA and LiFABA as further described hereinbelow, are salts and do not dissolve or disperse in hydrophobic norbornene monomers of formula (I). This also slows down or inhibit mass polymerization as specifically shown in the comparative examples that follow hereinbelow.

Accordingly, it has now been found that use of small amounts of low boiling solvents to deliver the catalyst and activators (i.e., the co-catalysts) solve one or more of the aforementioned unmet needs in the art. In general, use of such low amounts of solvents was found to be sufficient to dissolve the catalyst components into the monomers and increased the polymerization rates and conversions. It is further demonstrated that these catalyst delivery solvents can be systematically altered to change the polymerization rates so that shelf-life of more reactive monomers can be extended. It has now been found that the choice of solvents depends upon the coordinating ability of the suitable solvents to transition metals so as to modulate the reactivity. That is, the coordinating ability of the solvent can either increase or decrease the reactivity of the catalyst employed, see Chem. Eur. J. 2020, 26, 4350-4377. It has been now found that the solvents having coordinating ability index ($\alpha$) less than zero (0) are more suitable for the compositions of this invention containing hydrophobic monomers as described below. The coordinating ability index ($\alpha$) is a measure of the coordination ability of the solvent to transition metal. As the value of $\alpha$ is lowered the lower the coordinating ability. In other words, solvent having $\alpha$ lower than zero (0) is generally considered as non-coordinating solvent. In some embodiments, the solvents employed in the composition of this invention have a coordinating ability index ($\alpha$) from about −0.1 to about −2.5. In some other embodiments the solvents employed in the composition of this invention have a coordinating ability index (a) from about −0.2 to about −2.0. As noted, the amount of solvent employed is generally in small quantities. Such amounts can vary so as to obtain desirable results. In general, such amounts may be less than five weight percent based upon total weight of the composition. For example, it can be as low as one weight percent, two weight percent, three weight percent or four weight percent. In some embodiments the amount of solvent employed is from about five weight percent to about ten weight percent; in some other embodiments it may be from about ten weight percent to about twenty weight percent based on the total weight of the composition.

It should further be noted that the composition of this invention can be used under both thermal and photo mass polymerization conditions. As noted above, under thermal mass polymerization conditions the composition undergoes mass polymerization by subjecting to the composition to suitable temperature, generally higher than about 100° C. as further described herein detail below. However, the polymerization temperature can be lowered significantly when solvent mixture contains small amounts of water as described in detail below.

Similarly, the composition of this invention undergoes mass polymerization when subjected to suitable actinic radiation as well known in the art. In order to undergo photo polymerization the composition generally contains a organopalladium compound as described herein which can be activated by a photoactivator, which generally is photoactive acid generator. In some embodiments, non-limiting examples of suitable photoactive organopalladium compounds include the following:

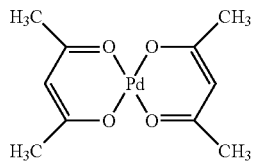

palladium (acetylacetonate)$_2$ (Pd304);

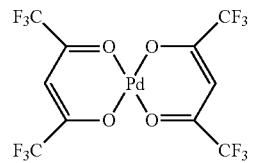

palladium (hexafluoroacetylacetonate)$_2$ (Pd(hfac)$_2$ or Pd520);

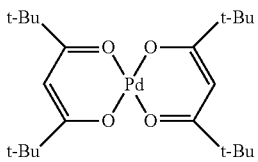

bis(2,2,6,6-tetramethyl-3,5-heptanedionato)palladium(II) (Pd472);

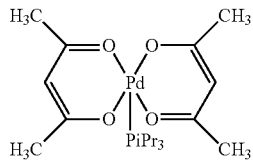

palladium (acetylacetonate)$_2$ tri-isopropylphosphine; and

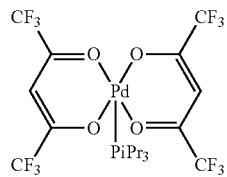

palladium (hexafluoroacetylacetonate)$_2$ tri-isopropylphosphine (Pd680).

Suitable photoacid generators that can be employed without any limitation include the following:

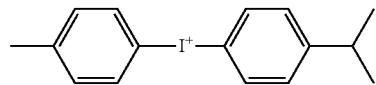

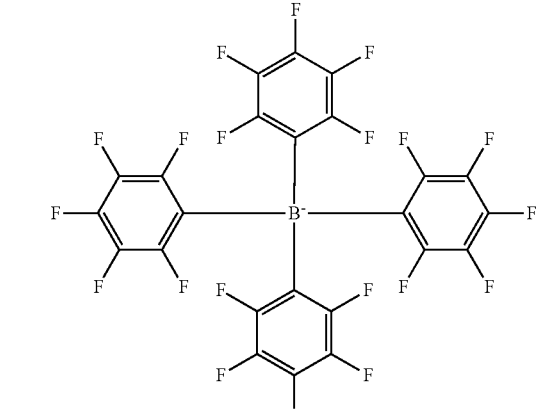

tolylcumyliodonium-tetrakis pentafluorophenylborate, commercially available under the tradename Bluesil PI 2074© from Elkem Silicones;

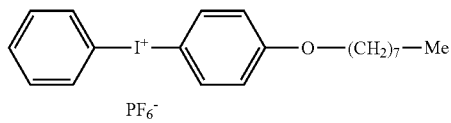

[4-(octyloxy)phenyl]-phenyliodonium (hexafluoro)phosphate (OPPI PF$_6$);

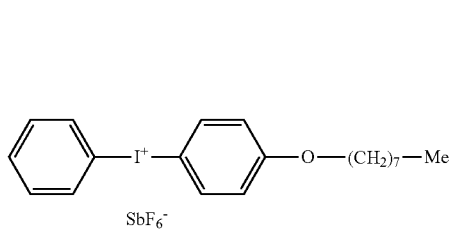

[4-(octyloxy)phenyl]-phenyliodonium (hexafluoro)antimonate (OPPI SbF$_6$);

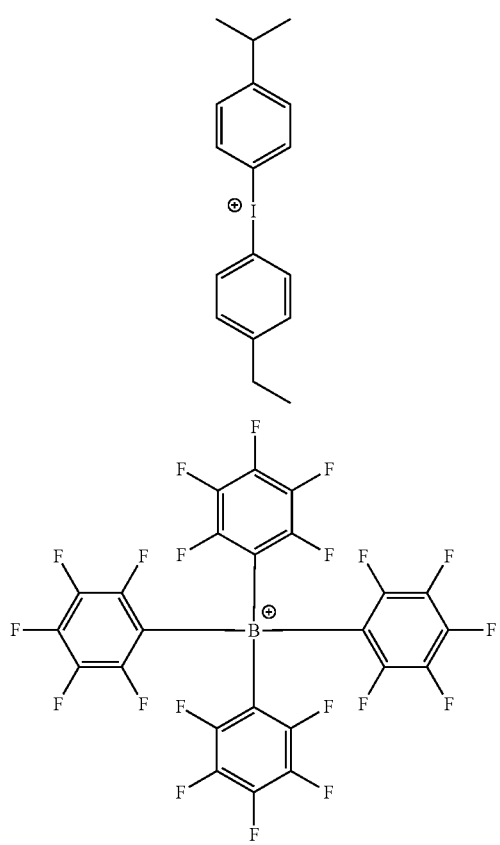

(4-ethylphenyl)(4-isopropylphenyl)iodonium tetrakis(perfluorophenyl)borate;

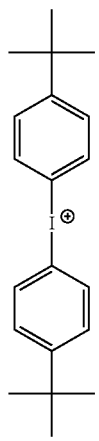 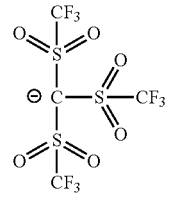

di-(p-t-butylphenyl)iodonium tris(trifluoromethanesulfonyl)methanide;

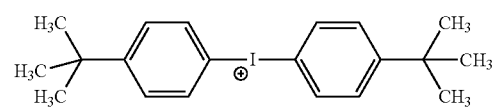

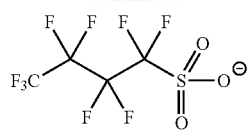

bis(4-tert-butylphenyl)iodonium perfluoro-1-butanesulfonate;

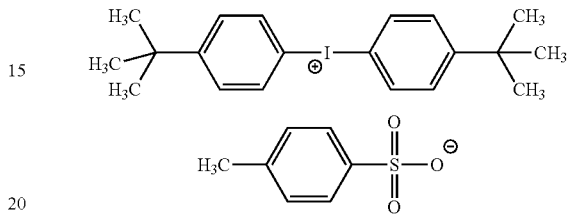

bis(4-tert-butylphenyl)iodonium p-toluenesulfonate;

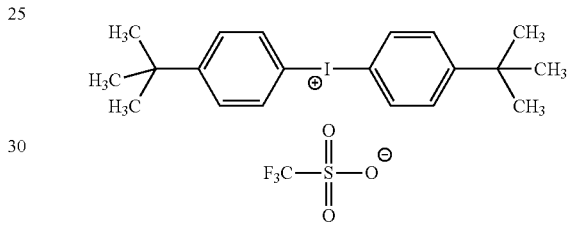

bis(4-tert-butylphenyl)iodonium triflate;

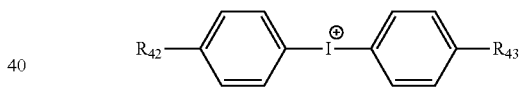

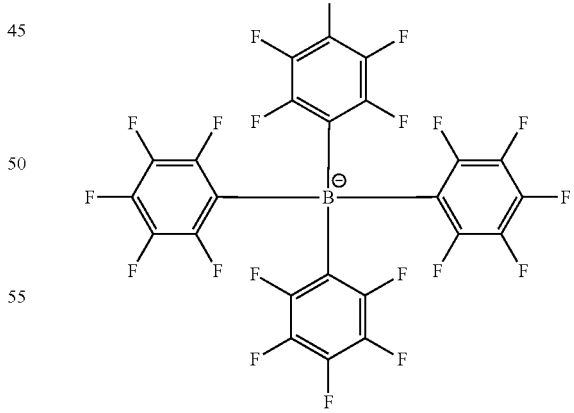

where $R_{42}$ and $R_{43}$ are the same or different and each independently selected from linear or branched ($C_{10}$-$C_{13}$)alkyl, for example iodonium, diphenyl-, 4,4'-di-$C_{10-13}$-alkyl derivatives, tetrakis(2,3,4,5,6-pentafluorophenyl)borates are commercially available under the tradename SILCOLEASE UV CATA 243; and

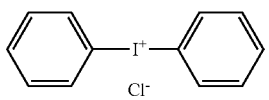

diphenyliodonium chloride.

Accordingly, the hydrophobic monomers of formula (I) are defined as the ones wherein:

m is 0 or 1;

----- is a single bond or a double bond;

$R_1$, $R_2$, $R_3$ and $R_4$ are the same or different and each independently selected from the group consisting of hydrogen, linear or branched ($C_4$-$C_{16}$)alkyl, ($C_3$-$C_{10}$)cycloalkyl, ($C_3$-$C_{10}$)cycloalkenyl, ($C_6$-$C_{12}$)bicycloalkyl, ($C_6$-$C_{12}$)aryl and ($C_6$-$C_{12}$)aryl($C_1$-$C_6$)alkyl; or one of $R_1$ and $R_2$ taken together with one of $R_3$ and $R_4$ and the carbon atoms to which they are attached to form a substituted or unsubstituted ($C_5$-$C_8$)cyclic, ($C_7$-$C_{10}$) bicyclic ring optionally containing one or more double bonds.

In some other embodiments, the hydrophobic monomer of formula (I) is having:

m is 0;

----- is a single bond;

$R_1$, $R_2$, $R_3$ and $R_4$ are the same or different and each independently selected from the group consisting of hydrogen, n-butyl, n-hexyl, cyclohexyl, cyclohexenyl and norbornyl.

The Aryl as defined in formula (I) can encompass various aromatic groups known in the art. For example, Aryl can be substituted or unsubstituted biphenyl of formula:

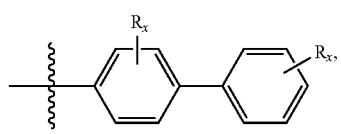

substituted or unsubstituted naphthyl of formula:

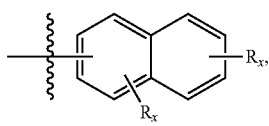

substituted or unsubstituted terphenyl of formula:

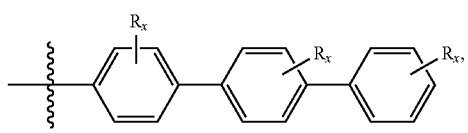

substituted or unsubstituted anthracenyl of formula:

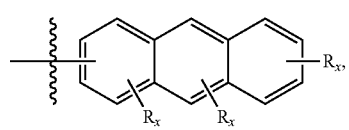

substituted or unsubstituted fluorenyl of formula:

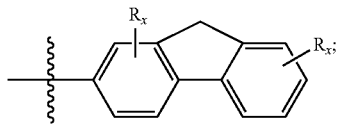

where $R_x$ in each occurrence is independently selected from methyl, ethyl, linear or branched ($C_3$-$C_{12}$)alkyl or ($C_6$-$C_{10}$)aryl;

The monomers of formula (I) as described herein are themselves known in the literature or can be prepared by any of the known methods in the art to make such or similar types of monomers.

As noted, the compositions of this invention may further encompass at least one multifunctional monomeric compound. Again, this is an optional component of the composition of this invention. Any of the multifunctional monomeric compound that can facilitate the formation of a three-dimensional crosslinked structure can be used in this invention. In some embodiments such multifunctional monomeric compound that can be employed is a bifunctional monomeric compound. Non-limiting examples of such bifunctional monomeric compounds that can be employed include the following:

a compound of formula (A1):

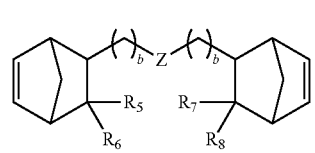

wherein:

b is an integer from 2 to 6;

Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched ($C_3$-$C_6$)alkyl;

$R_5$, $R_6$, $R_7$ and $R_8$ are the same or different and each independently of one another selected from the group consisting of hydrogen, methyl, ethyl and linear or branched ($C_3$-$C_{16}$)alkyl; and a compound of formula (A2):

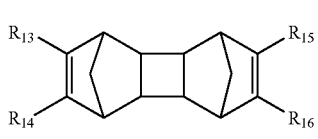

wherein $R_{13}$, $R_{14}$, $R_{15}$ and $R_{16}$ are the same or different and each independently of one another selected from the group consisting of hydrogen, methyl, ethyl and linear or branched ($C_3$-$C_{16}$)alkyl; and a compound of formula (A3):

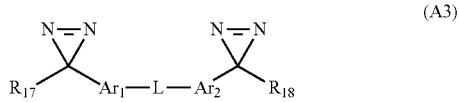

Wherein
L is a bond or a divalent linking or a spacer group selected from:
methylene, ethylene, linear or branched ($C_3$-$C_{16}$)alkylene, ($C_3$-$C_{16}$)cycloalkylene, ($C_5$-$C_8$)heterocycle, ($C_6$-$C_{12}$)arylene, ($C_5$-$C_{12}$)heteroarylene and —$(CH_2)_cO(CH_2)_c$—, where c is an integer from 1 to 6 and optionally each of $CH_2$ may be substituted with methyl, ethyl, linear or branched ($C_3$-$C_{16}$)alkyl, and ($C_6$-$C_{12}$)aryl, and wherein optionally portions of hydrogen on methylene, ethylene or ($C_3$-$C_{16}$)alkylene are replaced with a group selected from the group consisting of fluorine, trifluoromethyl, pentafluoroethyl and linear or branched perfluoro($C_3$-$C_{16}$)alkyl;
$R_{17}$ and $R_{18}$ are the same or different and each is independently selected from methyl, ethyl, linear or branched ($C_3$-$C_{12}$)alkyl, ($C_6$-$C_{12}$)aryl and ($C_6$-$C_{12}$)aryl($C_1$-$C_{12}$)alkyl, where optionally portions of hydrogen on methyl, ethyl or ($C_3$-$C_{12}$)alkyl are replaced with a group selected from the group consisting of fluorine, trifluoromethyl, pentafluoroethyl and linear or branched ($C_3$-$C_{12}$)perfluoroalkyl;
$Ar_1$ and $Ar_2$ are the same or different and each is independently selected from ($C_6$-$C_{12}$)arylene or ($C_6$-$C_{12}$)heteroarylene group optionally substituted with a group selected from ($C_1$-$C_4$)alkyl, ($C_1$-$C_4$)alkoxy, ($C_6$-$C_{10}$)aryl, ($C_6$-$C_{12}$)aryloxy, ($C_6$-$C_{12}$)aryl($C_1$-$C_4$)alkyl and ($C_6$-$C_{12}$)aryl($C_1$-$C_4$)alkyloxy.
wherein the film formed from the composition has a dielectric constant (Dk) less than 2.4 at a frequency of 10 GHz, a glass transition temperature greater than 150° C. and a coefficient of thermal expansion (CTE) less than 150 ppm/K.

It should be noted that the composition of this invention is a mass polymerizable composition when subjected to suitable temperature conditions. That is, generally, when a composition of this invention containing one or more monomers of formula (I), optionally one or more compounds of formula (A1) or (A2) or (A3), a solvent as described herein, at least one organopalladium compound and an activator as listed herein are heated to certain temperature the composition undergoes mass polymerization to form a solid object. Any of the temperature conditions that will bring about such a mass polymerization can be used herein. In some embodiments, the composition of this invention is heated to a temperature of about 60° C. to about 150° C. for a sufficient length of time, for example from about one hour to eight hours. In some other embodiments, the composition of this invention is heated to a temperature of about 90° C. to about 130° C. for a sufficient length of time, for example from about one hour to four hours. As noted, the organopalladium compound and the activator employed to affect the mass polymerization are dissolved in the solvent as specified or maybe soluble in the monomers employed so as to form a homogeneous solution. The solution so formed is then mixed with one or more monomers of formula (I) and optionally a compound of formula (A1) or (A2) or (A3) to form a homogeneous solution. Such mass polymerization methods are very well known and any of the known procedures known in the art can be employed herein to form the films of this invention. See for instance, U.S. Pat. No. 6,825,307, pertinent portions of which are incorporated herein by reference.

In some embodiments, the film forming composition contains a monomer of formula (I), wherein
m is 0;
----- is a single bond;
$R_1$, $R_2$, $R_3$ and $R_4$ are the same or different and each independently selected from the group consisting of hydrogen, n-butyl, n-hexyl, cyclohexyl, cyclohexenyl and norbornyl.

Again, any of the monomers of formula (I) can be used to form the film forming composition of this invention. Non-limiting examples of such a monomer of formula (I) is selected from the group consisting of:

bicyclo[2.2.1]hept-2-ene (norbornene or NB);

bicyclo[2.2.1]hepta-2,5-diene (norbornadiene or NBD);

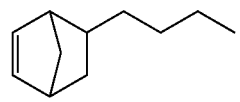

5-butylbicyclo[2.2.1]hept-2-ene (BuNB);

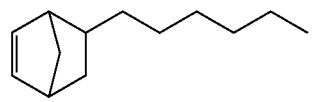

5-hexylbicyclo[2.2.1]hept-2-ene (HexNB);

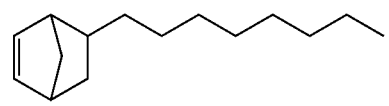

5-octylbicyclo[2.2.1]hept-2-ene (OctNB);

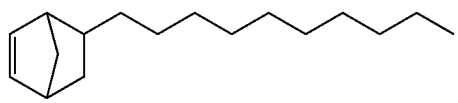 [SMILES: CCCCCCCCCCC1CC2C=CC1C2]

5-decylbicyclo[2.2.1]hept-2-ene (DecNB);

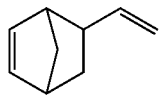

5-vinylbicyclo[2.2.1]hept-2-ene (VNB);

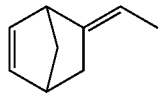

5-ethylidenebicyclo[2.2.1]hept-2-ene (ENB);

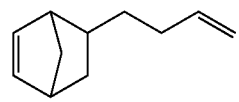

5-(but-3-en-1-yl)bicyclo[2.2.1]hept-2-ene (ButenylNB);

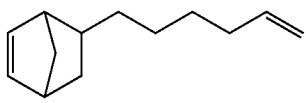

5-(hex-5-en-1-yl)bicyclo[2.2.1]hept-2-ene (HexenylNB);

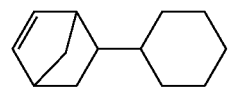 [SMILES: C1=CC2CC1CC2C1CCCCC1]

5-cyclohexylbicyclo[2.2.1]hept-2-ene (CyHexNB);

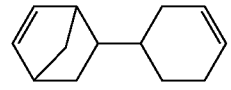

5-(cyclohex-3-en-1-yl)bicyclo[2.2.1]hept-2-ene (Cyclohex-eneNB);

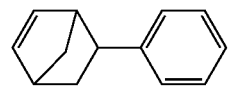

5-phenylbicyclo[2.2.1]hept-2-ene (PhNB);

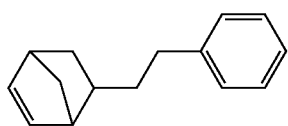 [SMILES: C1=CC2CC1CC2CCc1ccccc1]

5-phenethylbicyclo[2.2.1]hept-2-ene (PENB);

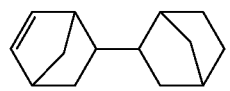

2,2'-bi(bicyclo[2.2.1]heptan-5-ene) (NBANB);

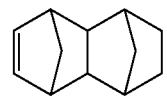

1,2,3,4,4a,5,8,8a-octahydro-1,4:5,8-dimethanonaphthalene, also known as tetracyclododecene (TD);

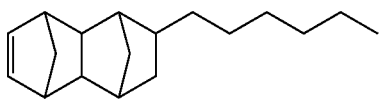 [SMILES: CCCCCCC1CC2CC1C1C3C=CC(C3)C21]

2-hexyl-1,2,3,4,4a,5,8,8a-octahydro-1,4:5,8-dimethanonaphthalene (HexTD);

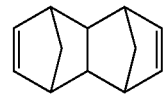 [SMILES: C1=CC2CC1C1C3C=CC(C3)C21]

1,4,4a,5,8,8a-hexahydro-1,4:5,8-dimethanonaphthalene (TDD);

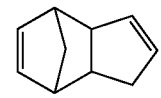

3a,4,7,7a-tetrahydro-1H-4,7-methanoindene (DCPD);

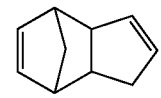

3a,4,4a,5,8,8a,9,9a-octahydro-1H-4,9:5,8-dimethanocyclopenta[b]naphthalene (CPD3);

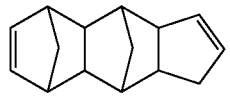 [SMILES: C1=CC2C(C1)C1CC2C2C3C=CC(C3)C12]

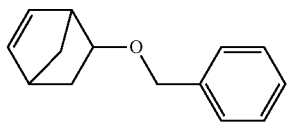 [SMILES: C1=CC2CC1CC2OCc1ccccc1]

5-(benzyloxy)bicyclo[2.2.1]hept-2-ene;

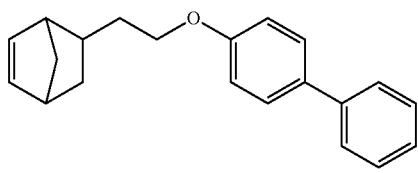 [SMILES: C1=CC2CC1CC2CCOc1ccc(-c2ccccc2)cc1]

5-(2-([1,1'-biphenyl]-4-yloxy)ethyl)bicyclo[2.2.1]hept-2-ene (NBEtOPhPh);

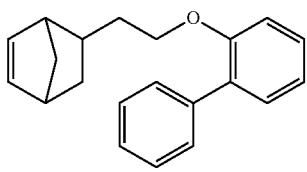 [SMILES: C1=CC2CC1CC2CCOc1ccccc1-c1ccccc1]

5-(2-([1,1'-biphenyl]-2-yloxy)ethyl)bicyclo[2.2.1]hept-2-ene (NBEtO-2-PhPh);

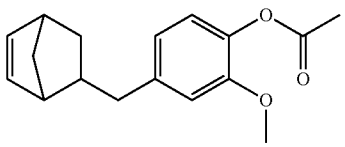 [SMILES: COc1cc(CC2CC3C=CC2C3)ccc1OC(C)=O]

5-norbornenylmethyleugenyl acetate (EuAcNB);

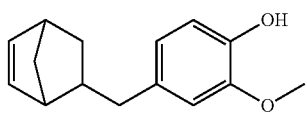 [SMILES: COc1cc(CC2CC3C=CC2C3)ccc1O]

5-norbornenylmethyleugenol (EuOHNB);

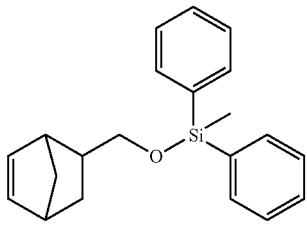 [SMILES: C[Si](OCC1CC2C=CC1C2)(c1ccccc1)c1ccccc1]

(bicyclo[2.2.1]hept-5-en-2-ylmethoxy)(methyl)diphenylsilane (NBCH$_2$OSiMePh$_2$);

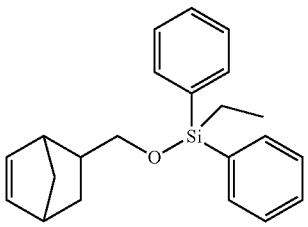 [SMILES: CC[Si](OCC1CC2C=CC1C2)(c1ccccc1)c1ccccc1]

(bicyclo[2.2.1]hept-5-en-2-ylmethoxy)(ethyl)diphenylsilane;

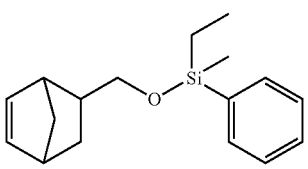 [SMILES: CC[Si](C)(OCC1CC2C=CC1C2)c1ccccc1]

(bicyclo[2.2.1]hept-5-en-2-ylmethoxy)(ethyl)(methyl)(phenyl)silane;

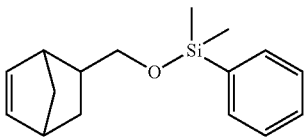 [SMILES: C[Si](C)(OCC1CC2C=CC1C2)c1ccccc1]

(bicyclo[2.2.1]hept-5-en-2-ylmethoxy)dimethyl(phenyl)silane;

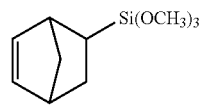

bicyclo[2.2.1]hept-5-en-2-yltrimethoxysilane (TMSNB);

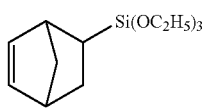

bicyclo[2.2.1]hept-5-en-2-yltriethoxysilane (NBSi(OC$_2$H$_5$)$_3$);

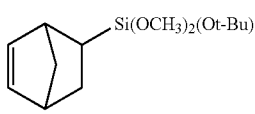

bicyclo[2.2.1]hept-5-en-2-yl(tert-butoxy)dimethoxysilane;

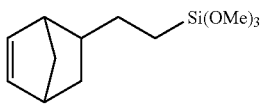

(2-(bicyclo[2.2.1]hept-5-en-2-yl)ethyl)trimethoxysilane;

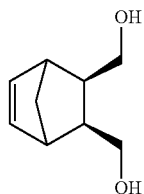 [SMILES: OC[C@@H]1C2C=CC(C2)[C@@H]1CO]

NB(MeOH)$_2$;

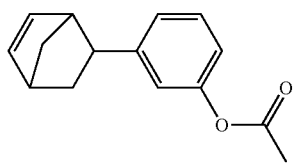 [SMILES: CC(=O)Oc1cccc(C2CC3C=CC2C3)c1]

PhAcNB;

5-(phenoxymethyl)bicyclo[2.2.1]hept-2-ene (NBMeOPh);

5-(([1,1'-biphenyl]-2-yloxy)methyl)bicyclo[2.2.1]hept-2-ene (NBMeOPhPh);

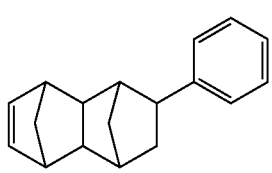 [SMILES: C1=CC2CC1C1C3CC(c4ccccc4)C(C3)C21]

2-phenyl-tetracyclododecene (PhTD);

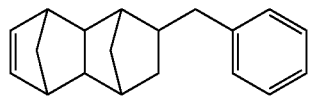 [SMILES: C1=CC2CC1C1C3CC(Cc4ccccc4)C(C3)C21]

2-benzyl-1,2,3,4,4a,5,8,8a-octahydro-1,4:5,8-dimethanonaphthalene;

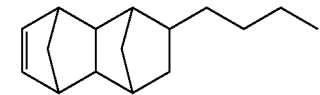 [SMILES: CCCCC1CC2CC1C1C3C=CC(C3)C21]

2-phenethyl-1,2,3,4,4a,5,8,8a-octahydro-1,4:5,8-dimethanonaphthalene (PETD);

2-butyl-1,2,3,4,4a,5,8,8a-octahydro-1,4:5,8-dimethanonaphthalene (ButylTD);

2-hexyl-1,2,3,4,4a,5,8,8a-octahydro-1,4:5,8-dimethanonaphthalene (HexylTD);

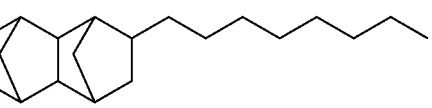

2-octyl-1,2,3,4,4a,5,8,8a-octahydro-1,4:5,8-dimethanonaphthalene (OctylTD);

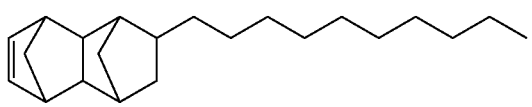 [SMILES: CCCCCCCCCCC1CC2CC1C1C3C=CC(C3)C21]

2-decyl-1,2,3,4,4a,5,8,8a-octahydro-1,4:5,8-dimethanonaphthalene (DecylTD);

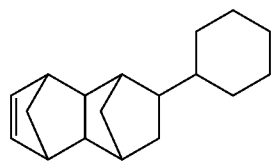 [SMILES: C1=CC2CC1C1C3CC(C4CCCCC4)C(C3)C21]

2-cyclohexyl-tetracyclododecene (CyclohexylTD);

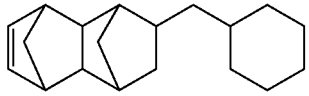 [SMILES: C1=CC2CC1C1C3CC(CC4CCCCC4)C(C3)C21]

2-cyclohexylmethyl-1,2,3,4,4a,5,8,8a-octahydro-1,4:5,8-dimethanonaphthalene;

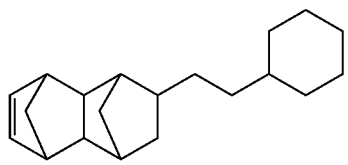 [SMILES: C1=CC2CC1C1C3CC(CCC4CCCCC4)C(C3)C21]

2-cyclohexylethyl-1,2,3,4,4a,5,8,8a-octahydro-1,4:5,8-dimethanonaphthalene; and

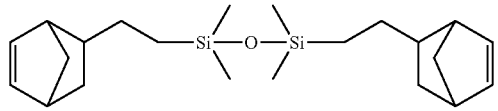 [SMILES: C[Si](C)(CCC1CC2C=CC1C2)O[Si](C)(C)CCC1CC2C=CC1C2]

(1,2,3,4,4a,5,8,8a-octahydro-1,4:5,8-dimethanonaphthalen-2-yl)methyl acetate (TDMeOAc).

Similarly, any of the specific examples within the scope of formulae (A1) can be employed in the film forming composition of this invention which will bring about the intended benefit. Non-limiting examples of such a compound of formula (A1) is selected from the group consisting of:

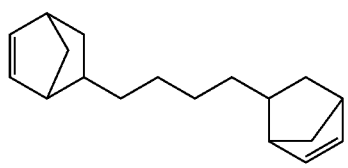 [SMILES: C1=CC2CC1CC2CCCCC1CC2C=CC1C2]

1,3-bis(2-(bicyclo[2.2.1]hept-5-en-2-yl)ethyl)-1,1,3,3-tetramethyldisiloxane (NBC2DMSC2NB); and

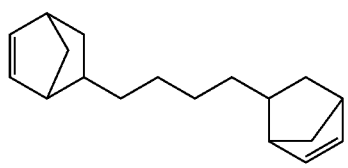 [SMILES: C1=CC2CC1CC2CCCCC1CC2C=CC1C2]

1,4-di(bicyclo[2.2.1]hept-5-en-2-yl)butane (NBC4NB).

Any of the specific examples within the scope of formulae (A2) can be employed in the film forming composition of this invention which will bring about the intended benefit. Non-limiting examples of such a compound of formula (A2) is:

1,4,4a,4b,5,8,8a,8b-octahydro-1,4:5,8-dimethanobiphenylene ((NBD)2).

Finally, any of the specific examples within the scope of formulae (A3) can be employed in the film forming composition of this invention which will bring about the intended benefit. Non-limiting examples of such a compound of formula (A3) is:

3,3'-((oxybis(methylene))bis(4,1-phenylene))bis(3-(trifluoromethyl)-3H-diazirine);

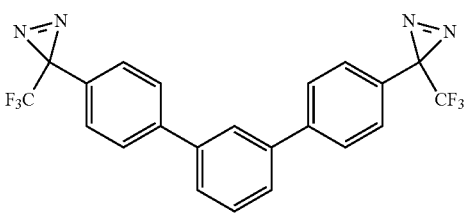 [SMILES: FC(F)(F)C1(c2ccc(-c3cccc(-c4ccc(C5(C(F)(F)F)N=N5)cc4)c3)cc2)N=N1]

4,4''-bis(3-(trifluoromethyl)-3H-diazirin-3-yl)-1,1':3',1''-terphenyl;

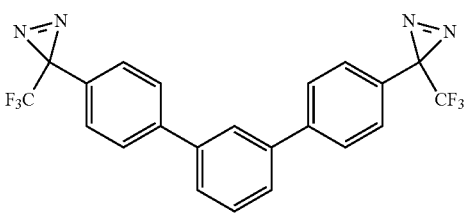 [SMILES: FC(F)(F)C1(c2ccc(-c3cccc(-c4ccc(C5(C(F)(F)F)N=N5)cc4)c3)cc2)N=N1]

3,5-bis(4-(3-(trifluoromethyl)-3H-diazirin-3-yl)phenyl)pyridine;

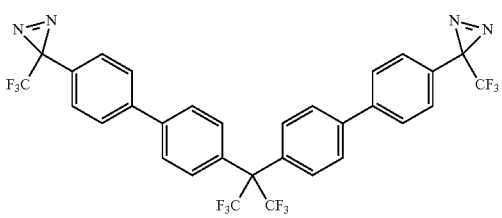 [SMILES: FC(F)(F)C1(c2ccc(-c3ccc(C(c4ccc(-c5ccc(C6(C(F)(F)F)N=N6)cc5)cc4)(C(F)(F)F)C(F)(F)F)cc3)cc2)N=N1]

3,3'-((perfluoropropane-2,2-diyl)bis([1,1'-biphenyl]-4',4-diyl))bis(3-(trifluoromethyl)-3H-diazirine); and

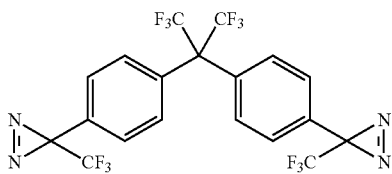 [SMILES: FC(F)(F)C1(c2ccc(C(c3ccc(C4(C(F)(F)F)N=N4)cc3)(C(F)(F)F)C(F)(F)F)cc2)N=N1]

3,3'-((perfluoropropane-2,2-diyl)bis(4,1-phenylene))bis(3-(trifluoromethyl)-3H-diazirine), commercially available as GEN-I BondLynx from XLynX Materials, Inc.

As noted, the film forming composition according to this invention contains at least one monomer of formula (I) and optionally at least one compound of formula (A1) or (A2) or (A3). Any of the amounts of a monomer of formula (I) with a compound of formula (A1) or (A2) or (A3) can be employed to form the composition of this invention that would bring about the intended benefit, including either the low dielectric properties as described herein and/or thermal/mechanical properties or both or any other desirable property depending upon the intended final application. Accordingly, the molar ratio of a monomer of formula (I) to a compound of formula (A1) or (A2) or (A3) can be from 100:0 to 90:10. In some embodiments, the molar ratio of a monomer of formula (I):a compound of formula (A1) or (A2) or (A3) is in the range from 99:1 to 95:5; in some other embodiments it is from 98:2 to 91:9; it is from 97:3 to 92:8; it is from 96:4 to 93:7; and so on.

It should further be noted that more than one monomer of formula (I) and more than one compound of formulae (A1) or (A2) or (A3) can also be used in the composition of this invention. Accordingly, the molar ratio of first monomer of formula (I) to second monomer of formula (I) can be from 1:99 to 99:1. In some embodiments, the molar ratio of first monomer of formula (V):second monomer of formula (V) is in the range from 5:95 to 95:5; in some other embodiments it is from 10:90 to 90:10; it is from 15:85 to 85:15; it is from 20:80 to 80:20; it is from 30:70 to 70:30; it is from 60:40 to 40:60; and it is 50:50, and so on. Similarly, any desirable amounts of more than one compound of formulae (A1) or (A2) or (A3) can be used including various ratios as used herein when more than one monomer of formula (I) is used in the composition of this invention.

In general, the composition in accordance with the present invention encompass the above described one or more of monomer of formula (I), as it will be seen below, various composition embodiments are selected to provide properties to such embodiments that are appropriate and desirable for the use for which such embodiments are directed, thus such embodiments are tailorable to a variety of specific applications. Accordingly, in some embodiments the composition of this invention contains more than two distinct monomers of formula (I), such as for example three different monomers of formula (I) or four different monomers of formula (I) along with any desirable number of compounds of formulae (A1) or (A2) or (A3).

For example, as already discussed above, by employing proper combination of different monomers of formula (I) it is now possible to tailor a composition having the desirable low dielectric properties and thermo-mechanical properties, among other properties. In addition, it may be desirable to include other polymeric or monomeric materials which are compatible to provide desirable low loss and low dielectric properties depending upon the end use application as further discussed in detail below.

Even more advantageously it has now been found that employing one or more of compounds of formula (A1) or (A2) or (A3) it is now possible to form crosslink structures within the polymeric framework. That is, crosslinks can occur intra-molecular (i.e., between two cross-linkable sites on the same polymer chain). Statistically, this can happen, and all such combinations are part of this invention. By forming such inter-molecular or intramolecular crosslinks the polymers formed from the composition of this invention provide hitherto unobtainable properties. This may include for example improved thermal properties. That is, much higher glass transition temperatures than observed for non-crosslinked polymers of similar composition. In addition, such crosslinked polymers are more stable at higher temperatures, which can be higher than 350° C. High temperature stability can also be measured by well-known thermogravimetric analysis (TGA) methods known in the art. One such measurement includes a temperature at which the polymer loses five percent of its weight ($T_{d5}$). As will be seen below by specific examples that follow the $T_{d5}$ of the polymers formed from the composition of this invention can generally be in the range from about 270° C. to about 320° C. or higher. In some embodiments, the $T_{d5}$ of the polymers formed from the composition of this invention is in the range from about 280° C. to about 300° C.

It should further be noted that in order to achieve the crosslinking of the polymers formed from the composition it is not always necessary to use one or more compounds of formulae (A1) or (A2) or (A3). That is, when a monomer of formula (I) contains one or more distinct monomer containing an unsaturated double bond that itself may serve as crosslinkable monomer with another polymeric chain either intermolecularly or intramolecularly as described above. Accordingly, in some embodiments there is provided a composition containing at least two monomers of formula (I) wherein at least one monomer contains a double bond. Any of such combinations are also part of this invention.

In addition, it should be noted that the crosslinked polymers formed from the composition of this invention may form thermosets thus offering additional advantages especially in certain applications where thermoplastics are not desirable. For example, any of the applications where higher temperatures are involved the thermoplastic polymers become less desirable as such polymeric materials may flow and are not suitable for such high temperature applications. Such applications include millimeter wave radar antennas as contemplated herein, among other applications.

Advantageously, as described further below, the composition according to this invention can be formed into films. The films thus formed from the composition of this invention exhibit hitherto unattainable combination of low dielectric properties and very high glass transition temperatures, among other improved properties. Accordingly, in some embodiments the film formed from the composition of this invention has dielectric constant (Dk) of 2.0 to 2.38 at a frequency of 10 GHz, a glass transition temperature from about 160° C. to about 350° C. and a coefficient of thermal expansion (CTE) from about 100 ppm/K to about 140 ppm/K. In some other embodiments the film formed from the composition of this invention has dielectric constant (Dk) of 2.10 to 2.30 at a frequency of 10 GHz, a glass transition temperature from about 190° C. to about 350° C. and a coefficient of thermal expansion (CTE) from about 100 ppm/K to about 140 ppm/K. In yet some other embodiments the film formed from the composition of this invention has a glass transition temperature from about 220° C. to about 350° C. or higher.

Advantageously it has further been found that the low dielectric properties of the films formed from the composition of this invention can be improved by incorporating one or more filler materials. The filler materials can either be organic or inorganic. Any of the known filler materials which bring about the intended benefit can be used herein.

Accordingly, in some embodiments, the film forming composition according to this invention comprises an inorganic filler. Suitable inorganic filler is the one which has a coefficient of thermal expansion (CTE) lower than of the film formed the composition of this invention. Non-limiting examples of such inorganic filler includes oxides such as silica, alumina, diatomaceous earth, titanium oxide, iron oxide, zinc oxide, magnesium oxide, metallic ferrite; hydroxides such as aluminum hydroxide, magnesium hydroxide; calcium carbonate (light and heavy); magnesium carbonate, dolomite; carbonates such as doronite; sulfates such as calcium sulfate, barium sulfate, ammonium sulfate, and calcium sulfite; talc, mica; clay; glass fibers; calcium silicate; montmorillonite; silicates such as bentonite; borates such as zinc borate, barium metaborate, aluminum borate, calcium borate, and sodium borate; carbon black; carbon such as carbon fibers; iron powder; copper powder; aluminum powder; zinc oxide; molybdenum sulfide; boronic fibers; potassium titanate; and lead zirconate.

In some other embodiments the film forming composition according to this invention further comprises an organic filler, which is generally a synthetic resin maybe in the form of a powder or can be in any other suitable form or a polymer. Examples of such polymeric fillers include without any limitation, poly(α-methylstyrene), poly(vinyl-toluene), copolymers of α-methylstyrene and vinyl-toluene, and the like. Further examples of such synthetic resin powder include powders of various thermosetting resins or thermoplastic resins such as alkyd resins, epoxy resins, silicone resins, phenolic resins, polyesters, acrylic and methacrylic resins, acetal resins, polyethylene, polyethers, polycarbonates, polyamides, polysulfones, polystyrenes, polyvinyl chlorides, fluororesins, polypropylene, ethylene-vinyl acetate copolymers, and powders of copolymers of these resins. Other examples of the organic filler include aromatic or aliphatic polyamide fibers, polypropylene fibers, polyester fibers, aramid fibers, and the like.

In some embodiments the filler is an inorganic filler. Thus, the coefficient of thermal expansion can be effectively reduced. Further, heat resistance can be improved. Accordingly, in some embodiments the inorganic filler is silica. Thus, the thermal expansion coefficient can be reduced while the dielectric characteristic is improved. Various forms of silica fillers are known in the art and all of such suitable silica fillers can be used in the composition of this invention. Examples of such silica filler include without any limitation fused silica, including fused spherical silica and fused crushed silica, crystalline silica, and the like. In some embodiments the filler employed is a fused silica. Advantageously it has now been observed that by employing spherical silica it is now possible to form composition containing the maximum filling amount, which can be as high as 80 weight percent. By using a suitable silica filler, dielectric properties can be made particularly excellent. Generally, the amount of filler material can vary from about 5 weight percent to 80 weight percent or higher. In some embodiments, the content of the filler in the composition is from about 30 to 80 weight percent, based on the total solid content of the composition when polymerized to form film/sheet as described herein. By appropriately adjusting the content of the filler, the balance between the dielectric property and the thermal expansion coefficient can be improved. In some other embodiments, the content of the filler in the composition is from about 40 to 70 weight percent, based on the total solid content of the composition.

In general, the filler is treated with a silane compound having an alkoxysilyl group and an organic functional group such as an alkyl group, an epoxy group, a vinyl group, a phenyl group and a styryl group in one molecule. Such silane compounds include, for example, a silane having an alkyl group such as ethyltriethoxysilane, propyltriethoxysilane or butyltriethoxysilane (alkylsilane), a silane having a phenyl group such as phenyltriethoxysilane, benzyltriethoxysilane or phenethyltriethoxysilane, a silane having a styryl group such as styryltrimethoxysilane, butenyltriethoxysilane, propenyltriethoxysilane or vinyltrimethoxysilane (vinylsilane), a silane having an acrylic or methacrylic group such as γ-(methacryloxypropyl) trimethoxysilane, a silane having an amino group such as γ-aminopropyltriethoxysilane, N-β (aminoethyl)-γ-aminopropyltrimethoxysilane, N-phenyl-γ-aminopropyltrimethoxysilane or an epoxy group such as γ-(3,4-epoxycyclohexyl) ureido triethoxysilane, and the like. Silanes having a mercapto group such as γ-mercaptopropyltrimethoxysilane or the like can also be used. It should further be noted that one or more of the aforementioned silane compounds can be used in any combination.

It should further be noted that, when an inorganic filler is used as the filler, the filler is generally treated with a "nonpolar silane compound". Thus, the adhesion between the cyclic olefin polymer formed from the composition of this invention and the filler can be improved. As a result, the mechanical characteristics of the molded body can be improved. Advantageously, it has now been observed that treatment with a "nonpolar silane compound" can eliminate or reduce adverse effects on dielectric properties. As used herein, "nonpolar silane compound" refers to a silane compound having no polar substituent. Polar substituents refer to groups that can be hydrogen-bonded or ionically dissociated. Such polar substituents include, but are not limited to, —OH, —COOH, —COOM, $NH_3$, $NR_4^+A^-$, —$CONH_2$, and the like. Where, M is a cation such as an alkali metal, an alkaline earth metal or a quaternary ammonium salt, R is H or an alkyl group having 8 or less carbon atoms, and A is an anion such as a halogen atom.

In some embodiments, the surface of the filler is modified with a vinyl group. It is advantageous to employ a vinyl group as it is a non-polar substituent, thus providing much needed low dielectric properties. In order to modify the surface of the filler with a vinyl group, for example, vinylsilane can be used. Specific examples of the vinylsilane are as described hereinabove.

In general, the average particle size of the filler used is in the range from about 0.1 to 10 μm. In some embodiments, it is from about 0.3 to 5 μm, and in some other embodiments it is from about 0.5 to 3 μm. The average particle size is defined as the average diameter of the particles as measured by the light scattering method. When more than one type of filler is used, the average particle diameter of one or more of such fillers is still within the aforementioned numerical range. Since the average particle diameter of the filler is suitably small, the specific surface area of the filler is reduced. As a result, the number of polar functional groups which may adversely affect the dielectric properties is reduced, and the dielectric properties are easily improved. In addition, when the average particle diameter of the filler is suitably small, it is easy to polymerize and form the films from the composition of this invention. Even more importantly, the films/sheets so formed exhibit much needed uniform thickness and flatness as is needed in many of the intended applications.

The composition of the present invention may contain components other than those described above. The components other than the above include a coupling agent, a flame retardant, a release agent, an antioxidant, and the like. Non-limiting examples of the coupling agent include, silane coupling agents, such as, vinylsilanes, acrylic and methacrylic silanes, styrylsilanes, isocyanatosilanes, and the like. Adhesion between the composition of this invention and a base material or the like can be improved by using a silane coupling agent.

Non-limiting examples of the flame retardant include a phosphorus-based flame retardant such as trixylenyl phosphate, dixylenyl phosphate, 10-(2,5-dihydroxyphenyl)-10H-9-oxa-10 phosphaphenanthrene-10-oxide, a halogen-based flame retardant such as a brominated epoxy resin, and an inorganic flame retardant such as aluminum hydroxide and magnesium hydroxide.

The composition of this invention may further include one or more compounds or additives having utility as, among other things, adhesion promoter, a surface leveling agent, a synergist, plasticizers, curing accelerators, free radical initiators, and the like.

Surprisingly, it has now been found that employing one or more thermal free radical generators it is now possible to accelerate the crosslinking of the polymer formed from the composition of this invention, resulting in a crosslinked polymer that exhibits much improved thermal properties. For example, both glass transition temperature ($T_g$) and temperature at which five weight percent weight loss occurs ($T_{d5}$) of the resulting polymer can be increased. Such increase in $T_g$ can be substantial and can range from about 10° C. to 50° C. In some embodiments the $T_g$ of the polymer is increased from 20° C. to 40° C. by employing suitable amounts of thermal free radical generator. Similarly, the $T_{d5}$ of the polymer can also be increased from about 3° C. to 10° C.

Any of the compounds which when exposed to heat forms a radical can be employed for this purpose. Suitable generic classes of such compounds include peroxides, peracids, azo compounds, N-alkoxyamines, N-acyloxyamines, and the like. Non-limiting examples of such specific thermal free radical generators include benzoyl peroxide, dicumyl peroxide (DCP), m-chloroperbenzoic acid, methyl ethyl ketone peroxide, azobisisobutyronitrile (AIBN), (1-phenyl-3,3-dipropyltriazene), (1-(phenyldiazenyl)pyrrolidine), (1-(phenyldiazenyl)piperidine), (1-(phenyldiazenyl)azepane), and the like.

Again, any of the suitable amounts of the thermal free radical generator can be employed in the composition of this invention which will bring about the intended effect. Generally, such amounts may vary from about 2 parts per hundred parts resin (pphr) to about 10 pphr or higher. In some embodiments the amount of photo radical generator employed is from about 3 pphr to about 6 pphr.

Non-limiting examples of the film forming composition according to this invention is selected from the group consisting of:

2-hexyl-1,2,3,4,4a,5,8,8a-octahydro-1,4:5,8-dimethanonaphthalene (HexTD), palladium (II) bis(tricyclohexylphosphine) diacetate (Pd785) and dimethylanilinium tetrakis(pentafluorophenyl)borate (DANFABA);

tetracyclododecene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

2,2'-bi(bicyclo[2.2.1]heptan-5-ene) (NBANB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), palladium (II) bis(tricyclohexylphosphine) diacetate (Pd785) and dimethylanilinium tetrakis(pentafluorophenyl)borate (DANFABA);

5-hexylbicyclo[2.2.1]hept-2-ene (HexNB), 2,2'-bi(bicyclo[2.2.1]heptan-5-ene) (NBANB), 1,3-bis(2-(bicyclo[2.2.1]hept-5-en-2-yl)ethyl)-1,1,3,3-tetramethyldisiloxane (NBC2DMSC2NB), palladium (II) bis(tricyclohexylphosphine) diacetate (Pd785) and dimethylanilinium tetrakis(pentafluorophenyl)borate (DANFABA);

3a,4,7,7a-tetrahydro-1H-4,7-methanoindene (DCPD), 5-hexylbicyclo[2.2.1]hept-2-ene (HexNB), palladium (II) bis(tricyclohexylphosphine) diacetate (Pd785) and dimethylanilinium tetrakis(pentafluorophenyl)borate (DANFABA); and 3a,4,7,7a-tetrahydro-1H-4,7-methanoindene (DCPD), 5-phenethylbicyclo[2.2.1]hept-2-ene (PENB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-(cyclohex-3-en-1-yl)bicyclo[2.2.1]hept-2-ene (CyclohexeneNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA); and 5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA).

It should be noted that the composition of this invention can be formed into any shape or form and not particularly limited to film. Accordingly, in some embodiments the composition of this invention can be formed into a sheet. The thickness of the sheet is not particularly limited, but when the application as a dielectric material is considered, the thickness is, for example, 0.01 to 0.5 mm. In some other embodiments the thickness is from about 0.02 to 0.2 mm. The sheet so formed generally does not substantially flow at room temperature (25° C.). The sheet may be provided on an arbitrary carrier layer or may be provided alone. Examples of the carrier layer include a polyimide film. Other known peelable films may be used.

As described above, the film/sheet formed in accordance of this invention has good dielectric properties. In quantitative terms, the relative permittivity, i.e., the dielectric constant (Dk) of the film/sheet at a frequency of 10 GHz is from about 2.0 to 2.38. The dielectric loss tangent at a frequency of 10 GHz is from about 0.0003 to 0.005, and in some other embodiments it is from about 0.0004 to 0.003. As a result, the composition of the present invention finds applications in a variety of devices where such low dielectric materials are needed, such as for example the millimeter wave radar to an antenna, among others. See for example, JP 2018-109090 and JP 2003-216823. An antenna is usually composed of an insulator and a conductor layer (for example, copper foil). The composition or sheet of the present invention can be used as a part or the whole of the insulator. The antenna using the composition or the sheet of the present invention as a part or the whole of the insulator has good high-frequency characteristics and reliability (durability).

The conductor layer in the antenna is formed of, for example, a metal having desirable conductivity. A circuit is formed on the conductor layer by using a known circuit processing method. Conductors forming the conductor layer include various metals having conductivity, such as gold, silver, copper, iron, nickel, aluminum, or alloy metals thereof. As a method for forming the conductor layer, a known method can be used. Examples include vapor deposition, electroless plating, and electrolytic plating. Alternatively, the metal foil (for example, copper foil) may be pressure-bonded by thermocompression bonding. The metal foil constituting the conductor layer is generally a metal foil used for electrical connection. In addition to the copper foil, various metal foils such as gold, silver, nickel and aluminum can be used. It may also comprise an alloy foil substantially (for example, 98 wt % or more) composed of these metals. Among these metal foils, a copper foil is commonly used. The copper foil may be either a rolled copper foil or an electrolytic copper foil.

As noted, the composition of this invention is generally used as such to form a film or sheet. However, in some embodiments the composition may contain small quantities of solvent in order to dissolve the catalyst as described herein above. In addition, the composition of this invention can also be used as a low molecular weight varnish-type material for certain applications. In such applications suitable amount of the desirable solvents can be added so as maintain the solid content of the composition to about 10 to 70 weight percent when polymerized. Again, any of the solvents that are suitable to form such solutions can be used as a single solvent or a mixture of solvents as is needed for such application.

In a further aspect of this invention there is provided a kit for forming a film. There is dispensed in this kit a composition of this invention. Accordingly, in some embodiments there is provided a kit in which there is dispensed one or more olefinic monomers of formula (I) as described herein, one or more compounds of formulae (A1) or (A2) or (A3) as described herein, an organopalladium compound as described herein; and an activator as described herein. In some embodiments the kit of this invention contains more than one monomer of formula (I) in combination with more than one compound of formulae (A1) or (A2) or (A3) so as to obtain a desirable result and/or for intended purpose.

In another aspect of this embodiment of this invention the kit of this invention undergoes mass polymerization only when subjected to suitable temperature for a sufficient length of time to form a polymeric film. That is to say that the composition of this invention is poured onto a surface or onto a substrate which needs to be encapsulated and exposed to suitable thermal treatment in order for the monomers to undergo polymerization to form a solid polymer which could be in the form of a film or a sheet as described herein.

Generally, as already noted above, such polymerization can take place at various temperature conditions, such as for example heating, which can also be in stages, for example heating to 90° C., then at 110° C., and finally at 150° C. for sufficient length of time, for example 5 minutes to 2 hours at each temperature stage, and if necessary further heating to higher than 150° C. for various lengths of time such as from 5 minutes to 15 minutes and so on. Alternatively, the polymerization can be carried out at one single temperature from about 100° C. to 250° C. for sufficient length of time which can be from 1 hour to 3 hours or longer. By practice of this invention it is now possible to obtain polymeric films on such substrates which are substantially uniform film. The thickness of the film can be as desired and as specifically noted above, and may generally be in the range of 50 to 500 microns or higher.

While making a sheet and to secure the flatness of the sheet and suppressing unintended shrinkage, various heating methods known to make sheet materials may be employed. For example, it is possible to heat at a relatively low temperature at first, and then gradually raise the temperature. In order to ensure flatness or the like, heating may be performed by pressurizing with a flat plate (glass plate) or the like before heating and/or by pressurizing with a flat plate. The pressure used for such pressurization may be, for example, 0.1 to 8 MPa, and in some other embodiments it may range from about 0.3 to 5 MPa.

In some embodiments of this invention the kit as described herein encompasses a composition which contains two or more monomers of formula (I) and two or more compounds of formulae (A1) or (A2) or (A3) as described hereinabove. Again, any of the monomers of formula (I) or compounds of formulae (A1) or (A2) or (A3) as described herein can be used in this embodiment, and in any desirable amounts depending on the nature of the intended use.

In some embodiments, the kit as described herein encompasses various exemplary compositions as described hereinabove.

In yet another aspect of this invention there is further provided a method of forming a film for the fabrication of a variety of optoelectronic and/or automotive device comprising:

forming a homogeneous clear composition comprising one or more monomers of formula (I) in combination with one or more compounds of formulae (A1) or (A2) or (A3); an organopalladium compound as described herein; an activator as described herein; and optionally a filler as described herein;

coating a suitable substrate with the composition or pouring the composition onto a suitable substrate to form a film; and heating the film to a suitable temperature to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 150° C. for about 1 to 180 minutes, although other appropriate temperatures and times can be used. In some embodiments the substrate is baked at a temperature of from about 100° C. to about 120° C. for 120 minutes to 180 minutes. In some other embodiments the substrate is baked at a temperature of from about 110° C. to about 150° C. for 60 minutes to 120 minutes.

The films thus formed are then evaluated for their electrical properties using any of the methods known in the art. For example, the dielectric constant (Dk) or permittivity and dielectric loss tangent at a frequency of 10 GHz was measured using a device for measuring the permittivity by the cavity resonator method (manufactured by AET, conforming to JIS C 2565 standard). The coefficient of thermal expansion (CTE) was measured using a thermomechanical analysis apparatus (made by Seiko Instruments, SS 6000) in accordance with a measurement sample size of 4 mm (width)×40 mm (Length)×0.1 mm (thickness), a measurement temperature range of 30-350° C., and a temperature rising rate of 5° C./min. The coefficient of linear expansion from 50° C. to 100° C. was adopted as the coefficient of linear expansion. Generally, the films formed according to this invention exhibit excellent dielectric properties and can be tailored to desirable dielectric properties as described herein.

Accordingly, in some of the embodiments of this invention there is also provided a film or sheet obtained by the mass polymerization of the composition as described herein. In another embodiment there is also provided an electronic device comprising the film/sheet of this invention as described herein.

In a further aspect of this invention it has been surprisingly found that addition of a small amount of water to the catalyst affords more reactive system in that the composition undergoes faster polymerization providing a polymeric product having improved properties. Accordingly, in some embodiments of this invention the composition of this invention is comprising of a catalyst solution containing at least about five weight percent water. In some other embodiments of this invention the composition of this invention is comprising of a catalyst solution containing from about five weight percent to about twenty weight percent of water. In some other embodiments of this invention the composition of this invention is comprising of a catalyst solution containing from about six weight percent to about ten weight percent of water.

Figure 6:
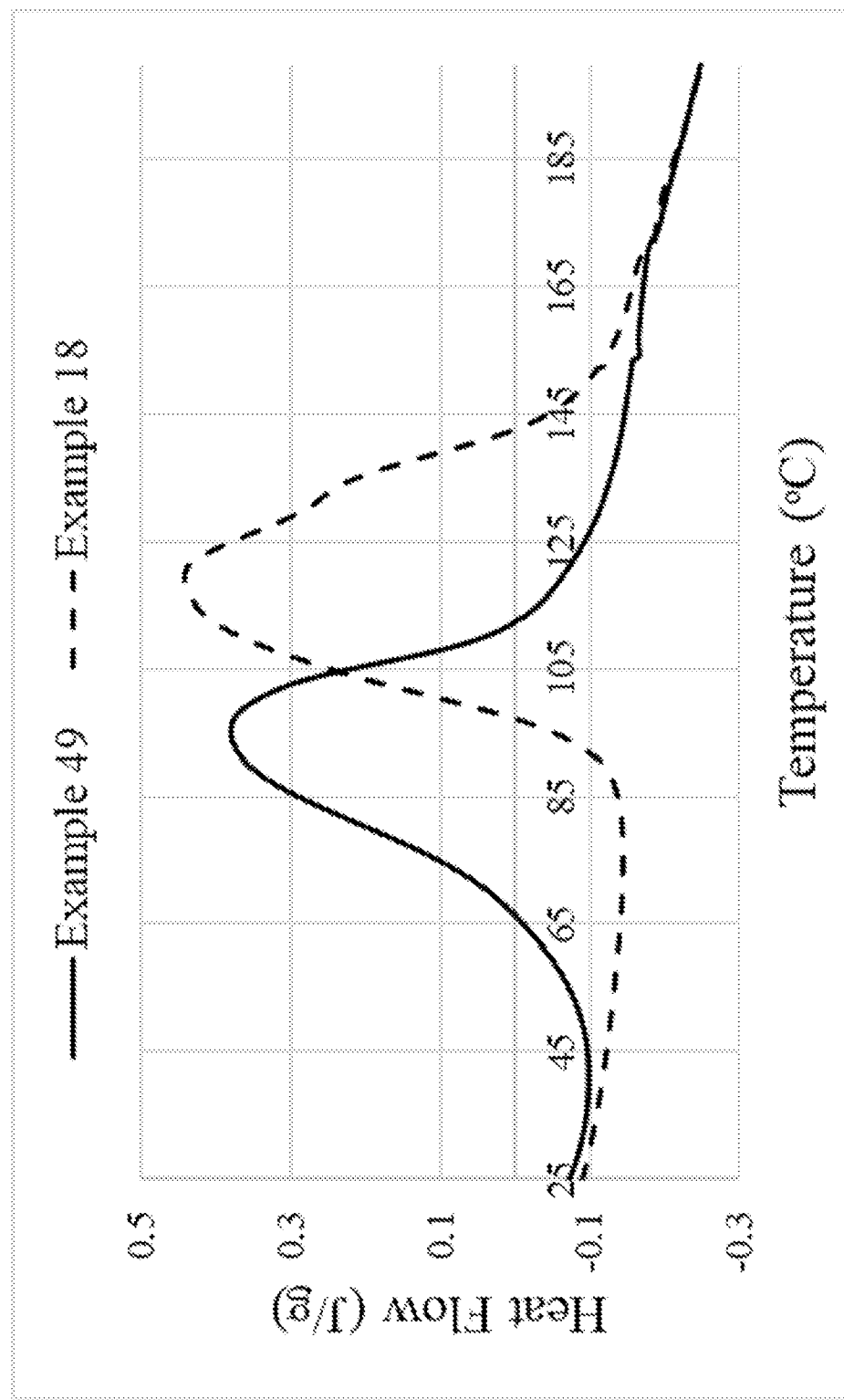
FIG. 6 shows comparative differential scanning calorimetric (DSC) thermograms obtained for an embodiment of this invention where the catalyst contained a small amount of water and another embodiment which contained no water as described herein.

As it becomes apparent from the specific examples that follow, by incorporating certain amount of water in the catalyst system it is now possible to accelerate the polymerization of the composition of this invention at considerably lower temperatures. That is, the onset of polymerization can be lowered as much as 30° C. by incorporating about eight weight percent of water into the catalyst system. This dramatic lowering of the onset of polymerization is shown in FIG. 6, where the onset of polymerization is shown for a composition containing about 7.6 weight percent water, which is compared with a composition containing no water. It is apparent that the onset of polymerization is lowered as much as 30° C. by the addition of water.

Advantageously, it has now further been found that the aging of the catalyst solution containing water further enhances the activity of the catalyst. Accordingly, in some embodiments of this invention the catalyst solution is aged for at least about ten days. In some other embodiments of this invention the catalyst solution is aged for about ten days to twenty days. In yet some other embodiments of this invention the catalyst solution is aged for about fourteen days to eighteen days. However, it should be noted that in some embodiments the catalyst solution containing water can be aged for less than ten days or much longer than twenty days depending upon the types of catalyst employed, all of which are within the scope of this invention.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES (GENERAL)

The following abbreviations have been used hereinbefore and hereafter in describing some of the compounds, instruments and/or methods employed to illustrate certain of the embodiments of this invention:

HexTD—2-hexyl-1,2,3,4,4a,5,8,8a-octahydro-1,4:5,8-dimethanonaphthalene; TD—tetracyclododecene; BuNB—5-butylbicyclo[2.2.1]hept-2-ene; PENB—5-phenethylbicyclo[2.2.1]hept-2-ene; PhNB—5-phenylbicyclo[2.2.1]hept-2-ene; DecNB—5-decylbicyclo[2.2.1]hept-2-ene; HexNB—5-hexylbicyclo[2.2.1]hept-2-ene; NBANB—2,2'-bi(bicyclo[2.2.1]heptan-5-ene; CyHexNB—5-cyclohexylbicyclo[2.2.1]hept-2-ene; DCPD—3a,4,7,7a-tetrahydro-1H-4,7-methanoindene; NBD—bicyclo[2.2.1]hepta-2,5-diene; TDD—1,4,4a,5,8,8a-hexahydro-1,4:5,8-dimethanonaphthalene; NBC2DMSC2NB—1,3-bis(2-(bicyclo[2.2.1]hept-5-en-2-yl)ethyl)-1,1,3,3-tetramethyldisiloxane; CPD3—3a,4,4a,5,8,8a,9,9a-octahydro-1H-4,9:5,8-dimethanocyclopenta[b]naphthalene; Pd785—palladium (II) bis(tricyclohexylphosphine) diacetate; DANFABA—dimethylanilinium tetrakis(pentafluorophenyl)borate; DCP—dicumyl peroxide; Rhodorsil-2074-tolylcumyliodonium-tetrakis pentafluorophenylborate; UV-CATA—iodonium, diphenyl-, 4,4'-di-$C_{10-13}$-alkyl derivatives, tetrakis(2,3,4,5,6-pentafluorophenyl)borates; EA—ethyl acetate; THF—tetrahydrofuran; CH—cyclohexane; MCH—methylcyclohexane; TFT—trifluorotoluene; GPC—gel permeation chromatography; $M_w$—weight average molecular weight; GC—gas chromatography; DSC—differential scanning calorimetry; TGA—thermogravimetric analysis; TMA—thermomechanical analysis; UV-VIS spectra—Ultraviolet-Visual spectroscopy.

Various monomers as used herein are either commercially available or can be readily prepared following the procedures as described in U.S. Pat. No. 9,944,818.

Examples 1-6

Catalyst stock solutions in sealed glass vials under nitrogen atmosphere were prepared in each of these Examples 1-6 by dissolving Pd785 (0.031 g, 0.039 mmol) in catalyst delivery solvent (3.2 g): Example 1—THF, Examples 2 and 5—toluene, Example 3—CH, Example 4—MCH and Example 6—TFT. Co-catalyst stock solutions were prepared in sealed glass vials under nitrogen atmosphere by dissolving DANFABA (0.176 g, 0.22 mmol) in co-catalyst delivery solvent either, THF or EA (3.2 g). The desired amounts of the catalyst or the co-catalyst solutions were withdrawn using syringe to add to the monomer. Samples of HexTD (2.44 g, 9.98 mmol) were mixed with Pd785 solutions in the desired solvent (0.07-0.08 g, 0.00098 mmol) and DANFABA solutions in desired solvents (0.08 g, 0.0055 mmol). The molar ratio of monomer/Pd785/DANFABA of the mixtures were about 10000/1/5.6 in all mixtures irrespective of the catalyst delivery solvent used.

The compositions of Examples 1 to 6 as prepared above were then heated in closed glass vials on a hot plate under air atmosphere at 110° C. for 3 hours. The polymers formed were extracted in 5-10 g of THF by sonication for 1 hour. The THF extracts were analyzed by GPC using THF as the eluent to determine the $M_w$ of the extracted polymer. The extracted portions were also analyzed by GC to determine the unreacted HexTD monomer content. This GC analysis of the unreacted monomer content was used to measure the percent conversion (% conversion) of HexTD monomer to its polymer during the heating. Any insoluble materials remained in the glass vials after THF extract were dried at 110° C. for 20 hours in a vacuum oven to determine the fraction of THF insoluble polymer (% insoluble) as an indication of the degree of cure.

The catalyst and co-catalyst delivery solvents used, the $M_w$ of the THF soluble portions of the cured materials, fraction of insoluble materials and the conversion of HexTD monomer to its polymer catalyzed by Pd785/DANFABA are summarized in Table 1. It is evident from the data presented in Table 1 that the use of a polar solvent such as THF to deliver the Pd785 catalyst or DANFABA co-catalyst had a detrimental effect on the conversion of the monomer to polymer as well as the $M_w$ of the resulting polymer (Examples 1 and 2). The conversions of HexTD as well as the resulting molecular weights increased when Pd785 was delivered in a non-polar solvent, such as toluene (Example 5), CH (Example 3), MCH (Example 4) or TFT (Example 6) in combination with EA as the co-catalyst delivery solvent.

TABLE 1

| Example No. | Pd785 Delivered | DANFABA Delivered | $M_w$ × 1000 | % Insoluble | % Conversion |
|---|---|---|---|---|---|
| 1 | THF | THF | 42 | <1 | 35 |
| 2 | Toluene | THF | 201 | 45 | 45 |
| 3 | CH | EA | 228 | 76 | 82 |
| 4 | MCH | EA | 192 | 77 | 85 |
| 5 | Toluene | EA | 263 | 76 | 88 |
| 6 | TFT | EA | 268 | 94 | 93 |

Examples 7-13

The solutions of Pd785 and DANFABA were prepared substantially following the procedures as set forth in Examples 1-6 except for slight modifications of the solvents as summarized in Table 2 and then mixing with HexTD to form compositions of Examples 7 to 13. Each of these compositions were then heated separately in closed glass vials on a hot plate under an atmosphere of air at 110° C. The times taken for the liquid mixtures to become gels (gel-time) were noted. The results are summarized in Table 2. It is apparent from the results presented in Table 2, the data are consistent with the results observed in Examples 1 to 6. That is, the conversion to polymer listed in Table 1 is consistent with the polymerization rates, measured as gel-time. The gel time in each of the Examples 7 to 13 was affected by the catalyst or co-catalyst delivery solvent. Polar solvents such as THF used to deliver either Pd785 or DANFABA decreased the polymerization rates as observed in increased gel-times (Examples 7-9). Non-polar solvents increased the polymerization rates as observed in decreased gel times (Examples 10-13).

TABLE 2

| Example No. | Pd785 Delivered | DANFABA Delivered | Gel-time |
|---|---|---|---|
| 7 | THF | THF | >180 min |
| 8 | Toluene | THF | >180 min |
| 9 | THF | EA | 6 min |
| 10 | MCH | EA | 3 min |
| 11 | Toluene | EA | 3 min |
| 12 | CH | EA | 2.5 min |
| 13 | TFT | EA | 2.5 min |

Examples 14-17

DSC Measurements

Catalyst and co-catalyst stock solutions were prepared in sealed glass vials under nitrogen atmosphere as follows: Pd785 (0.015 g, 0.019 mmol) dissolved in 1.6 g TD (used in Examples 15 and 16), Pd785 (0.03 g, 0.038 mmol) dissolved in 3.2 g THF (used in Example 14), Pd785 (0.031 g, 0.039 mmol) dissolved in 3.2 g of MCH (used in Example 17), DANFABA (0.174 g, 0.22 mmol) dissolved in 3.2 g THF (used in Examples 14 and 15), and DANFABA (0.174 g, 0.22 mmol) dissolved in 3.2 g EA (used in Examples 16 and 17).

A mixture of TD (1.92 g, 12 mmol) and BuNB (1.2 g, 7.98 mmol) prepared in glass vials was used in each of Examples 14 to 17. To this mixture was added Pd785 solution in the desired catalyst delivery solvent as noted above and DANFABA in the desired co-catalyst delivery solvent as noted above. The molar ratio of monomer/Pd785/DANFABA of the mixtures were kept at about 10500/1/5 in all compositions irrespective of the catalyst delivery solvent used.

Small amounts of the above mixtures were used for DSC measurements using temperature ramp from 20° C. to 150° C. at 5° C./min. The exotherm generated during the polymerizations were measured. About 1 g each of these mixtures were heated in an aluminum pans under air atmosphere on a hot plate at 110° C. for 3 hours. The weights of the material were measured before and after heating to determine the fraction of weight loss. Likewise about 2 g each of the rest of the mixtures were heated in closed glass vials at 110° C. The time taken for the liquid composition to become a gel (gel-time) were noted. The results are summarized in Table 3.

The observed exotherm was the lowest (82 J/g) and the gel-time was longer (60 seconds) when both the catalyst and the co-catalyst were delivered in THF (Example 14). When Pd785 was delivered in MCH and DANFABA was delivered in EA the higher exotherm (237 J/g), lower gel-time (45 seconds) and lowest weight loss (20%) were obtained in consistent with the results observed in Examples 1 to 13, that is, polar solvents, such as THF gives lower polymerization efficiency while non-polar solvents such as MCH gives higher polymerization efficiency. FIG. 1 shows the DSC thermographs where the use of THF as the catalyst and co-catalyst delivery solvent increases the peak temperature while the use of MCH to deliver Pd785 and EA to deliver DANFABA lowers the peak temperature. The gel time was longest for the Comparative Example 1 where no catalyst or co-catalyst delivery solvent was used. The DSC thermograph in FIG. 1 shows that the polymerization also commenced at a higher temperature of about 88° C. for the Comparative Example 1, as evidenced by the late onset of exotherm. The results from Examples 14-17 and the Comparative Example 1 demonstrate that the use of catalyst delivery solvent is not only advantageous for better dissolution or dispersion of the catalyst and the co-catalyst into the monomer but also to obtain a polymer having higher molecular weight and better properties. Moreover, non-polar solvents such as MCH are advantageous than polar solvents such as THF for polymerization efficiency as evidenced from the data presented in Table 3.

TABLE 3

| Example No. | Pd785 Delivered | DANFABA Delivered | Weight loss (%) | Gel-time (sec) | Exotherm (J/g) |
|---|---|---|---|---|---|
| Comp. Ex. 1 | No Solvent | No Solvent | 49 | 540 | 272 |
| 14 | THF | THF | 37 | 60 | 82 |
| 15 | TD | THF | 55 | 45 | 134 |
| 16 | TD | EA | 29 | 50 | 138 |
| 17 | MCH | EA | 20 | 45 | 237 |

Examples 18-22

DSC Measurements

The catalyst stock solutions of Pd785 prepared in Examples 14-17 were used in these Examples 18-21. A stock solution of Pd785 was made in TFT and LiFABA was used as the co-catalyst in Example 22: Pd785 (0.032 g, 0.041 mmol) dissolved in 3.2 g TFT, and LiFABA (0.174 g, 0.2 mmol) dissolved in 3.2 g THF.

A mixture of TD (1.92 g, 12 mmol) and BuNB (1.2 g, 7.98 mmol) was made in glass vials and used in each of Examples 18 to 22. To each of these compositions was added Pd785 solutions (0.16 g, 0.0019 mmol) in the desired catalyst delivery solvent and DANFABA solutions (0.16 g, 0.01 mmol) in the desired co-catalyst delivery solvent as noted above. The molar ratio of monomer/Pd785/DANFABA or LiFABA of the compositions were maintained at about 10500/1/5.3 in all Examples irrespective of the catalyst delivery solvent used.

A portion of the above compositions were used for DSC measurements from 20° C. to 250° C. at 5° C./min temperature ramp. The exotherm generated during the polymerization were measured. About 1 g each of these compositions were heated in aluminum pans in air on a hot plate at 110° C. for 3 hours. The weights of the material were measured before and after heating to determine the fraction of weight loss. Likewise, about 2 g each of the rest of the mixtures were heated in closed glass vials at 110° C. The times taken for the liquid mixtures to become gels (gel-time) were noted. The results are summarized in Table 4.

TABLE 4

| Example No. | Pd785 Delivered | LiFABA Delivered | Weight loss (%) | Gel-time (sec) | Exotherm (J/g) |
|---|---|---|---|---|---|
| Comp. Example 2 | No Solvent | No Solvent | 100 | >3 hours | None |
| 18 | THF | THF | 33 | 1200 | 353 |
| 19 | TD | THF | — | — | 338 |
| 20 | THF | EA | 27 | 600 | 380 |
| 21 | MCH | EA | 33 | 270 | 369 |
| 22 | TFT | EA | 29 | 165 | 382 |

Figure 2:
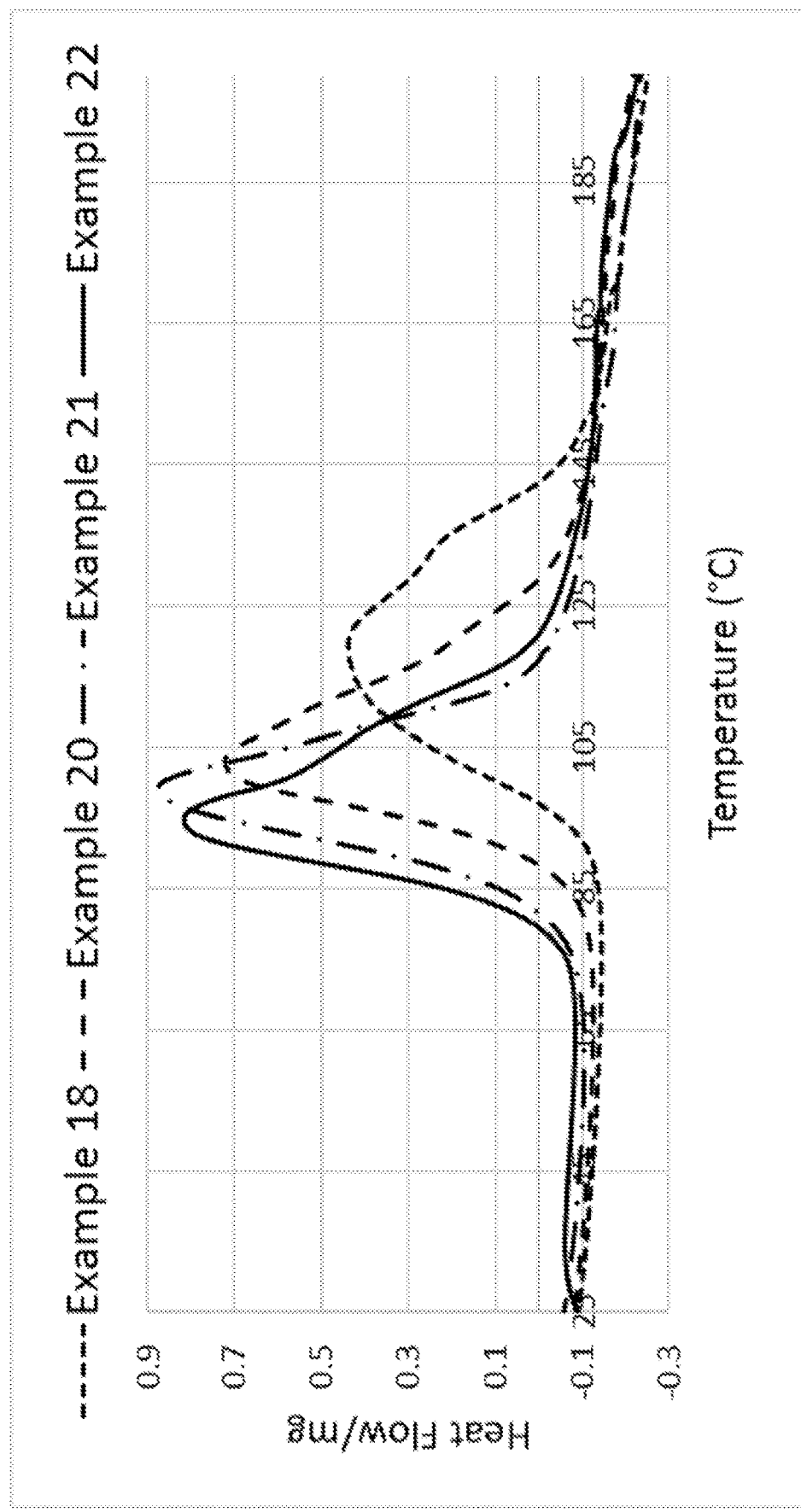
FIG. 2 shows differential scanning calorimetric (DSC) thermograms obtained for various embodiments of this invention using another type of catalyst activator as described herein.

The polymerization efficiency measured by the weight loss, gel-time and the exotherm generated for Pd785/LiFABA system (Example 22) also follow the same behavior as observed for Pd785/DANFABA demonstrated for examples 14-17 although the effects are less pronounced in this case. However, the DSC thermographs shown in FIG. 2 clearly demonstrates a shift to lower polymerization temperatures when non-polar solvents such as MCH or TFT are used to deliver Pd785 in combination with EA to deliver LiFABA. Comparative Example 2 had 100% weight loss after 100° C. for 3 hours heating and no gel was formed during the cure step indicating that no polymerization of the monomers occurred under these conditions. This is further confirmed by the observation of no exotherm during DSC measurements for the composition of Comparative Example 2 indicating no polymerization occurred. The results from Examples 18-22 and the Comparative Example 2 demonstrate that the use of proper catalyst delivery solvent is advantageous for not only better dissolution or dispersion of the catalyst and the co-catalyst into the monomer but also to obtain a polymer of good film forming property, among other property advantages.

Examples 23-28

Pd785 and DANFABA stock solutions were prepared following the procedures as set forth in Examples 14-17. Various compositions were then prepared substantially following the procedures of Examples 14-17 except for using NBANB (Examples 23 and 24), CyHexNB (Examples 25 and 26) and TD (Examples 27 and 28) as the monomers and various different solvents as summarized in Table 5. Again, in each of these Examples 23 to 28 the molar ratio of monomer/Pd785/DANFABA was kept at about 10000/1/5. The compositions were cured in open aluminum pans at 110° C. for 3 hours to generate weight loss data. The mixtures were also cured in closed glass vials at 110° C. to observe the gel-times. Table 5 lists the results obtained for Examples 23-28. It is again observed that the use of MCH to deliver Pd785 and EA to deliver DANFABA was advantageous in terms of polymerization efficiency as measured by the weight loss (monomer loss) during the cure step at 110° C. for 3 hrs. in an open aluminum pan or the time took to gel (form solid polymer) at 110° C. in a closed glass vial compared with polymerizations carried out using THF to deliver Pd785 and DANFABA.

TABLE 5

| Example No. | Monomer | Pd785 Delivered | DANFABA Delivered | Weight loss (%) | Gel-time (sec) |
|---|---|---|---|---|---|
| 23 | NBANB | THF | THF | 25 | 120 |
| 24 | NBANB | MCH | EA | 20 | 80 |
| 25 | CyHexNB | THF | THF | 21 | 75 |
| 26 | CyHexNB | MCH | EA | 17 | 55 |

TABLE 5-continued

| Example No. | Monomer | Pd785 Delivered | DANFABA Delivered | Weight loss (%) | Gel-time (sec) |
|---|---|---|---|---|---|
| 27 | TD | THF | THF | 36 | 60 |
| 28 | TD | MCH | EA | 26 | 45 |

Examples 29-37

Shelf Life Studies

Various compositions were prepared substantially following the procedures as set forth in Examples 14-22 except that in each of Examples 29 to 37 the monomers employed were TD and BuNB in a 60:40 molar ratio and different solvents to deliver the catalyst and the co-catalyst as summarized in Tables 6 and 7. The compositions prepared in glass vials were kept at ambient temperature and their viscosity was visually observed. The increase in viscosity was noted as not viscous, slightly viscous, viscous, gum, soft film and film to estimate the degree of viscosity or the degree of thermal curing at ambient temperature. The pot-life was deemed well if the mixture remained not viscous, slightly viscous or viscous where the mixture was still pourable onto a substrate to be cured and generated a film. The results are summarized in Tables 6 (LiFABA as the co-catalyst) and Table 7 (DANFABA as the co-catalyst). The compositions containing LiFABA as the co-catalyst (Examples 29-33) generally had a good pot-life compared to that of DANFABA (Examples 34-37). This observation is consistent with the DSC thermograms shown in FIG. 2 (LiFABA) vs. FIG. 1 (DANFABA) where the compositions containing LiFABA as the co-catalyst begun to cure (generated an exotherm) beginning at about 70° C. (FIG. 2) while the compositions containing DANFABA as the co-catalyst begun to cure (generated an exotherm) beginning at about 30° C. (FIG. 1). The choice of the catalyst and co-catalyst delivery solvent also affected the pot-life. The use of THF to deliver the catalyst and the co-catalyst extended the pot-life whereas the use of TFT or MCH shortened the pot-life.

TABLE 6

| Ex. No. | Pd785 Delivered | LiFABA Delivered | Viscosity | | | | | |
|---|---|---|---|---|---|---|---|---|
| | | | 3 hrs | Day-1 | Day-2 | Day-3 | Day-4 | Day-7 |
| 29 | THF | THF | Not viscous | Not viscous | Not viscous | Not viscous | Not viscous | Not viscous |
| 30 | THF | EA | Not viscous | Not viscous | Not viscous | Not viscous | Not viscous | Not viscous |
| 31 | MCH | EA | Not viscous | Not viscous | Not viscous | Not viscous | Not viscous | Not viscous |
| 32 | TFT | THF | Not viscous | Not viscous | Not viscous | Not viscous | Not viscous | Not viscous |
| 33 | TFT | EA | Not viscous | Not viscous | Slightly viscous | Slightly viscous | Slightly viscous | Slightly viscous |

TABLE 7

| Ex No. | Pd785 Delivered | DANFABA Delivered | Viscosity | | | | | | | |
|---|---|---|---|---|---|---|---|---|---|---|
| | | | 0.75 hours | 1 hour | 1.5 hours | 2 hours | 3 hours | 4 hours | 7 hours | 1 day |
| 34 | THF | THF | Not viscous | Not viscous | Not viscous | Not viscous | Viscous | Very viscous | Gum | Gum |
| 35 | TD | THF | Not viscous | Viscous | Gum | Gum | Gum | Gum | Gum | Soft film |
| 36 | TD | EA | Not viscous | Not viscous | Not viscous | Slightly viscous | Gum | Gum | Gum | Gum |
| 37 | MCH | EA | Viscous | Very viscous | Gum | Gum | Soft film | Soft film | Soft film | Film |

Example 38

Figure 3:
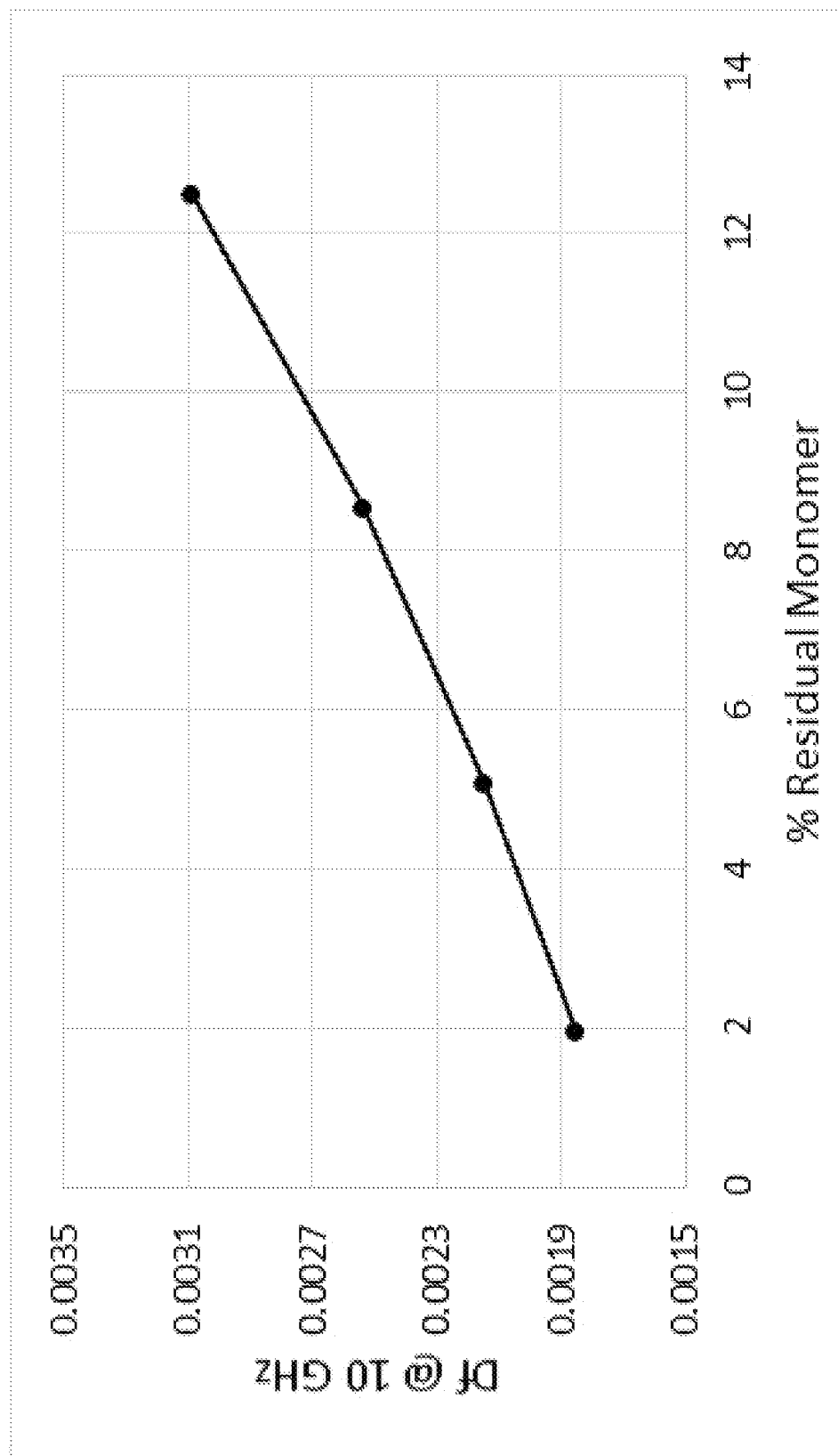
FIG. 3 shows correlational plot of dielectric loss factor (Df) and percent residual monomer present in the films made from various composition embodiments of this invention.

Pd785 (1 wt. %) and LiFABA (5 wt. %) stock solutions were prepared in THF as the solvent. Then PENB (5.95 g, 30 mmol) was mixed with Pd785 solution (0.24 g, 0.003 mmol) and LiFABA solution (0.15 g, 0.009 mmol). The molar ratio of monomer:Pd785:LiFABA was at about 10000:1:3. This composition was doctor bladed on glass substrates and cured in an oven for 1 hour for 80° C., 110° C., 120° C. and 130° C. to generate films of about 100-300 μm thickness. TGA under nitrogen atmosphere at a temperature ramp of 10° C./min was used to determine the temperature at which 5 wt. % of the film is lost ($T_{d5}$). This measurement is indicative of any residual monomer still present in the film due to insufficient curing or less than 100% of the monomers turning to polymer. The dielectric constant (Dk) and dielectric loss factor (tan δ or Df) were measured of these various films at 10 GHz frequency. Furthermore about 0.1-0.2 g of the films generated at various cure temperatures were extracted with THF (6-8 g) at 30° C. for 60 minutes to remove any unreacted monomer present in the films. The THF extracts were analyzed by GC to determine the residual monomer content of the films and the percent conversions of PENB monomer to polymeric films were calculated. The data presented in Table 8 shows that there is a correlation between the percent conversion (amount of residual monomer present in the films), $T_{d5}$ measured by TGA and dielectric loss factor (Df). FIG. 3 shows the relationship between the residual monomer and Df. The percent conversion is calculated based on the amount of residual monomer remaining in the film. From the data presented in Table 8 it is quite evident that higher the residual monomer lower the $T_{d5}$. In addition, Df is increased with increase in residual monomer.

This Example 38 further demonstrates the importance of employing appropriate conditions for mass polymerization thereby maximum conversion of the monomers can be achieved for improved thermal and dielectric properties.

TABLE 8

| Cure Temperature (° C.) | Residual Monomer (%) | Monomer Conversion (%) | $T_{d5}$ (° C.) | Df (10 GHz) |
|---|---|---|---|---|
| 80 | 12.5 | 87.5 | 138 | 0.00309 |
| 110 | 8.5 | 91.5 | 203 | 0.00254 |
| 120 | 5.1 | 94.9 | 227 | 0.00215 |
| 130 | 2 | 98 | 232 | 0.00186 |

Example 39

Figure 4:
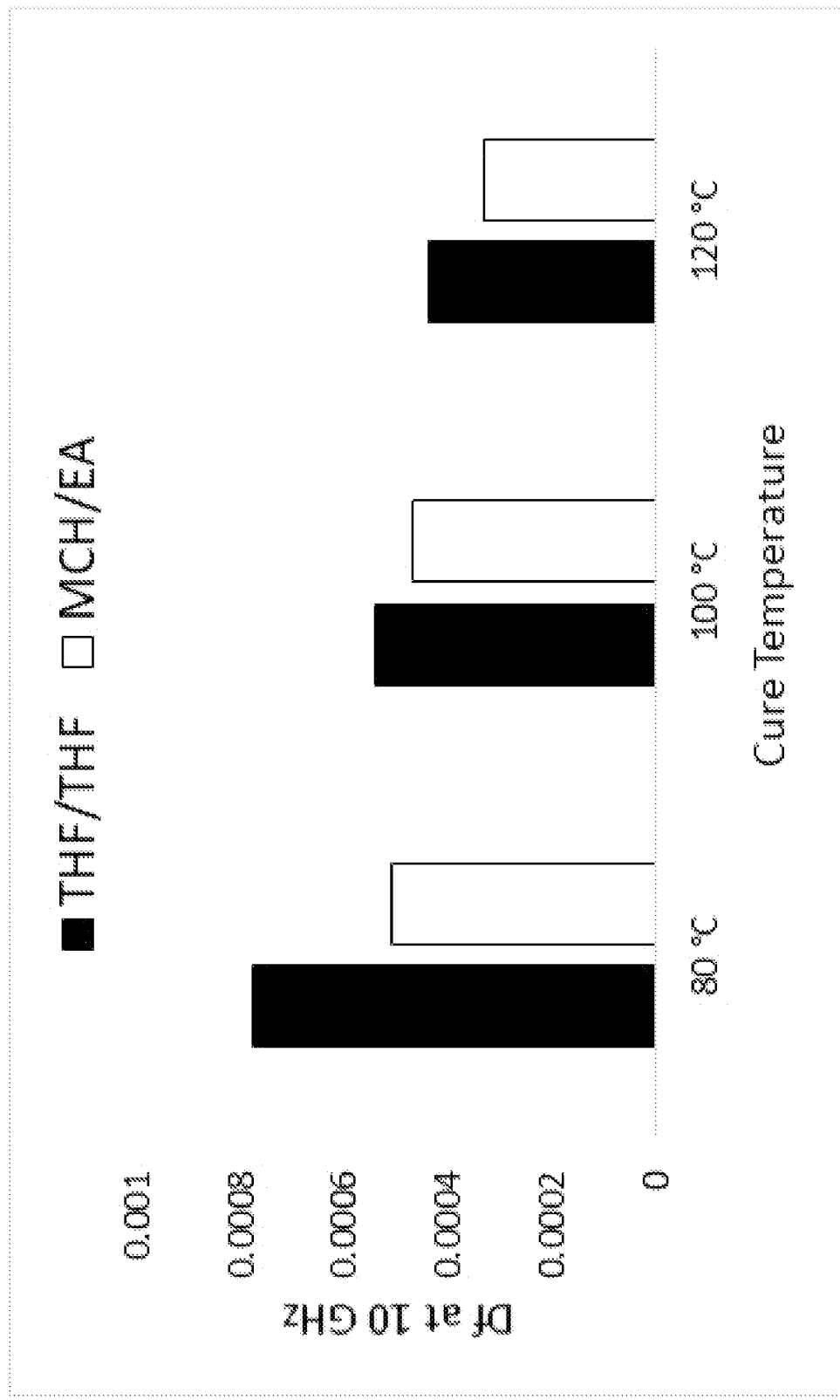
FIG. 4 shows bar chart of dielectric loss factor (Df) at various cure temperatures of the films made from various composition embodiments of this invention which are compared with the catalyst (e.g., Pd785) delivered in methyl cyclohexane (MCH) and the activator or co-catalyst (e.g., DANFABA) delivered in ethyl acetate (EA) and when both catalyst and co-catalyst are delivered in tetrahydrofuran (THF).

Pd785 (1 wt. %) in THF or MCH and DANFABA (5 wt. %) in THF or EA were made in sealed vials. Two compositions were made by adding Pd785/THF and DANFABA/THF to HexNB (3.56 g, 21.2 mmol) or Pd785/MCH and DANFABA/EA to HexNB (3.56 g, 21.2 mmol). The monomer:Pd785:DANFABA ratio was kept at about 10000:1:5. These compositions were doctor-bladed on glass substrates and cured 1 hours each at 80° C., 100° C., and 120° C. The dielectric dissipation factor (Df) was measured at 10 GHz. FIG. 4 shows that the Df value is lower as desired when Pd785 is delivered in MCH and DANFABA was delivered in EA compared to when both catalysts and co-catalyst are delivered in THF.

Examples 40-45

Pd785 and DANFABA stock solutions were prepared following the procedures set forth in Examples 14-17 using MCH as the solvent for Pd785 and EA as the solvent for DANFABA. The compositions were then prepared as follows: CyHexNB/BuNB (60/40 molar ratio) in Example 40, TD/BuNB (60/40 molar ratio) in Example 41, CyHexNB/BuNB/NBD (50/40/10 molar ratio) in Example 42, TD/BuNB/NBD (50/40/10 molar ratio) in Example 43, CyHexNB/BuNB/CPD3 (50/40/10 molar ratio) in Example 44 and CyHexNB/BuNB/CPD3 (50/40/10 molar ratio) with 4 parts per hundred DCP as a thermal radical initiator in Example 45. In each of these compositions the monomer/Pd785/DANFABA molar ratio was kept at about 10000/1/5. These compositions were poured onto glass substrates and doctor-bladed to generate rectangular shapes of about 10 cm×6 cm and subsequently cured at 110° C. for 3 hours to form rectangular films of about 200-500 μm thickness. These films were further treated to about 120-150° C. for 3-6 hours under vacuum to remove any residual monomers present. The rectangular films were cut into smaller rectangles for TMA and electrical properties such as dielectric constant (Dk) and dielectric loss factor (Df) at 10 GHz frequency. The glass transition temperatures ($T_g$), thermal decomposition temperatures as measured as the temperature at which 5 wt. % of the film weight was lost ($T_{d5}$), coefficient of thermal expansion (CTE), Dk and Df of the films prepared by the procedures set forth in this invention are summarized in Table 9.

TABLE 9

| Example No. | CTE (ppm/K) | $T_g$ (° C.) | $T_{d5}$ (° C.) | Dk at 10 GHz | Df at 10 GHz |
|---|---|---|---|---|---|
| Comp. Ex. 3 | 109 | 313 | 331 | 2.4 | 0.00820 |
| 40 | 99 | 350 | 328 | 2.21 | 0.0010 |
| 41 | 91 | 329 | 312 | 2.27 | 0.0009 |
| 42 | 88 | 329 | 294 | 2.36 | 0.0008 |
| 43 | 86 | 317 | 301 | 2.23 | 0.0010 |
| 44 | 86 | 329 | 284 | 2.21 | 0.0022 |
| 45 | 89 | 364 | 288 | 2.20 | 0.0010 |

The films were capable of high $T_g$, high $T_{d5}$, low CTE, low Dk and low Df. Furthermore, when a second cure pathway to remove residual monomers was utilized by incorporating a thermal free radical generator such as DCP as in Example 45 further decrease in Df to 0.001 at 10 GHz was obtained compared to Example 44 where such a second cure pathway to remove residual monomer was not utilized.

Example 46

Pd785 (1 wt. % in THF or MCH), Rhodorsil-2074 (about 5.5 wt. % in THF, EA or BuNB) and UV-CATA (about 7 wt. %) mixed with BuNB (3 g, 20 mmol) to prepare a series of compositions. The molar ratio of BuNB to Pd785 was set at 10000:1 ratio (0.002 mmol of Pd785) and the molar ratio of BuNB to Rhordorsil-2074 or UV-CATA was set at 10000:4 ratio (0.008 mmol of Rhordorsil-2274 or UV-CATA). These compositions (1 g each) were cured in an aluminum pan (open to atmosphere) on a hot plate at 110° C. for 2 hours. The final weight of the films formed were measured and the amount of the monomer lost during the cure were calculated. The weight loss or the monomer loss is an indication of the efficiency of the curing process when different solvents were used to deliver the catalyst and co-catalyst. Table 10 summarizes the weight loss data. The data demonstrates a low reactivity when the catalyst and co-catalyst are delivered in a coordinating solvent such as THF while the delivery of Pd785 in non-coordinating solvent such as MCH increases the cure efficiency.

The shelf-life stability of these compositions was also evaluated at ambient temperature. The slow polymerization of these compositions turned them slowly to viscous material that finally became a gum or a film. The compositions are useful to generate films if they are pourable even if the viscosity increased. However, once the compositions became gum or a film then they are no longer useful. The solutions that are deemed not viscous (n. viscous), slightly viscous (s. viscous), very viscous (v. viscous) are pourable. Table 11 summarizes the pot-life of these compositions of Example 46 demonstrating that the pot-life can be altered by the catalyst or co-catalyst delivery solvent. UV-CATA as the co-catalyst had better shelf-life stability than Rhordorsil-2074. The MCH to deliver Pd785 and EA to deliver UV-CATA had the best pot-life stability (2 weeks) as well as the best cure efficiency with lowest weight loss during cure (31% wt. loss with 69% monomer converted to film).

TABLE 10

| Pd785 delivered | Rhordorsil-2074 delivered | UV-CATA delivered | Wt. of film after cure (g) | Wt. loss (%) |
|---|---|---|---|---|
| THF | THF | | 0.20 | 80 |
| MCH | THF | | 0.44 | 56 |
| MCH | EA | | 0.40 | 60 |
| THF | | THF | 0.40 | 60 |
| MCH | | THF | 0.48 | 52 |
| MCH | | EA | 0.69 | 31 |
| MCH | | BuNB | 0.47 | 53 |

TABLE 11

| Pd785 delivered | Rhordorsil-2074 delivered | UV-CATA delivered | Day-0 | Day-8 | Day-12 | Day-14 | Day-23 |
|---|---|---|---|---|---|---|---|
| THF | THF | | n. viscous | n. viscous | s. viscous | v. viscous | gum |
| MCH | THF | | n. viscous | n. viscous | s. viscous | gum | gel |
| MCH | EA | | n. viscous | n. viscous | s. viscous | gum | gel |
| THF | | THF | n. viscous | n. viscous | n. viscous | n. viscous | n. viscous |
| MCH | | THF | n. viscous | n. viscous | n. viscous | s. viscous | viscous |
| MCH | | EA | n. viscous | n. viscous | n. viscous | viscous | gum |
| MCH | | BuNB | n. viscous | s. viscous | gel | gel | gel |

Example 47

Pd520 (0.9 wt. % in THF, EA or BuNB) and Rhordorsil-2074 (about 5.5 wt. % in THF or EA) mixed with BuNB (3 g, 20 mmol) to prepare a series of compositions. The molar ratio of BuNB to Pd520 was kept at 10000:1 molar ratio (0.001 mmol of Pd520) and the molar ratio of BuNB to Rhordorsil-2074 was kept at 10000:4 molar ratio (0.016 mmol of Rhordorsil-2074). 1 g each of these compositions were placed in an aluminum pan and exposed to 3 J/cm² radiation at 365 nm wavelength. All compositions turned into sticky films or gums after the irradiation indicating their photo-curing ability.

The shelf-life stability of these photo-curable compositions was also evaluated at ambient temperature under a yellow light to prevent any photo reaction. The slow thermal polymerization of these mixtures turned them viscous that finally became a gum or a film. The compositions are useful to generate films if they are pourable even if the viscosity increased. However, once the formulations become gummy or filmy then they are no longer useful. The solutions that are deemed not viscous (n. viscous), slightly viscous (s. viscous), very viscous (v. viscous) are pourable. Table 12 summarizes the pot-life of these compositions of Example 47 demonstrating that the shelf-life can be altered by the catalyst or co-catalyst delivery solvent of these photo-curable compositions. The use of a coordinating solvent such as THF to deliver Rhordorsil-2074 can increase the pot-life stability of these photo-curable compositions.

TABLE 12

| Pd-520 delivered | Rhordorsil-2074 delivered | Day-0 | Day-9 | Day-13 | Day-16 | Day-26 |
|---|---|---|---|---|---|---|
| BuNB | THF | n. viscous | s. viscous | s. viscous | viscous | Viscous |
| THF | THF | n. viscous | viscous | viscous | v. viscous | v. viscous |
| BuNB | EA | n. viscous | gum | gel | gel | gel |
| EA | EA | n. viscous | gum | gum | gel | gel |

Example 48

Figure 5:
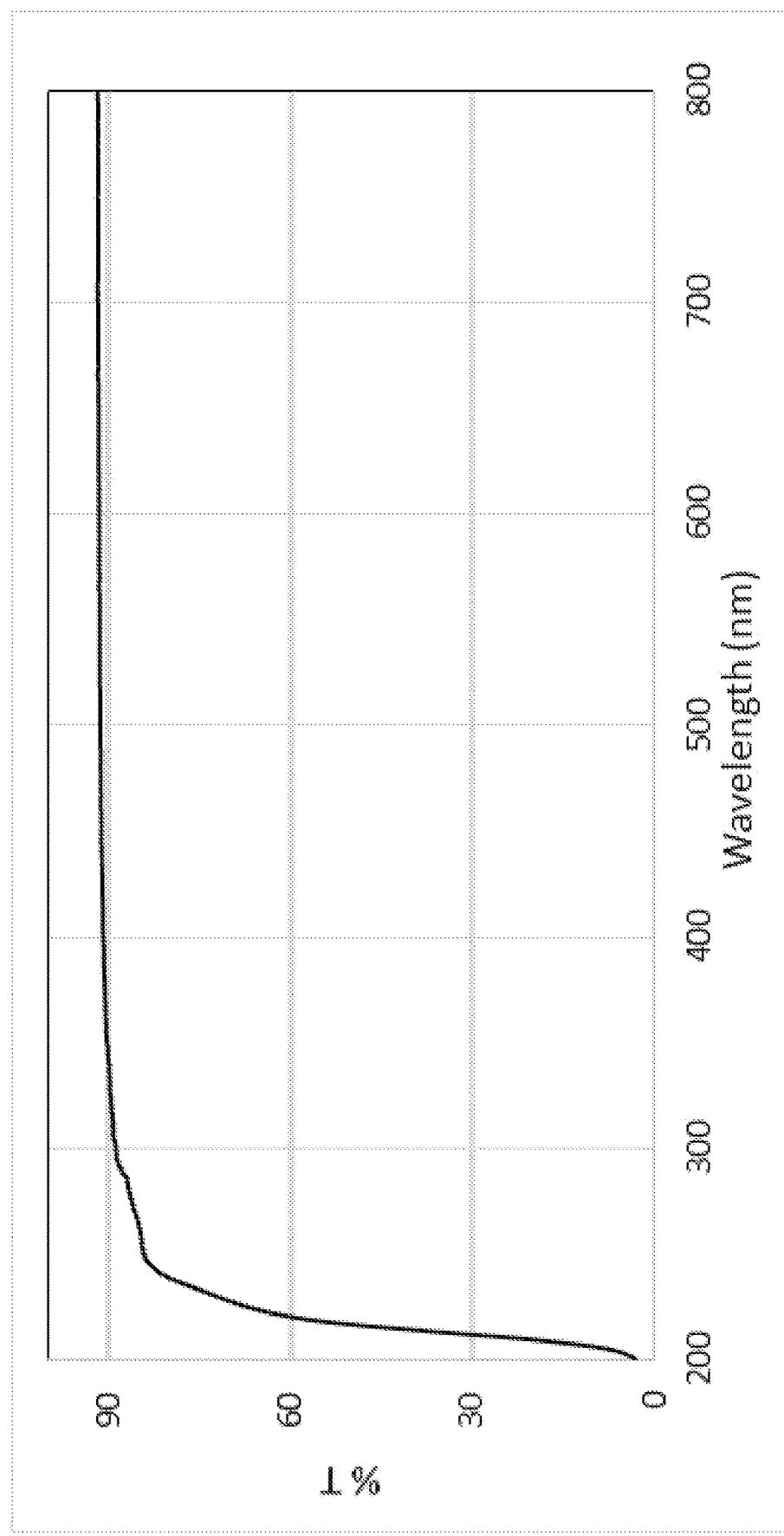
FIG. 5 shows a ultraviolet-visible (UV-VIS) spectrum of a free-standing film made from a composition embodiment of this invention.

A mixture of Pd785 (0.039 g, 0.005 mmol) and LiFABA (0.13 g, 0.015 mmol) mixed with THF (4.97 g) and 0.1 g of this mixture was added to HexNB (8.92 g, 53.1 mmol). The molar ratio of HexNB to Pd785 was set at 52100:1 ratio (0.001 mmol of Pd785) and the molar ratio of HexNB to LiFABA was set at 52100:3 ratio (0.003 mmol of LiFABA). This solution was sonicated for 90 minutes at ambient temperature and filtered through 0.2 µm PTFE filter. The solution was doctor-bladed on a glass substrate and cured at 110 C for 3 hours under nitrogen atmosphere to obtain a film of 140 µm thickness. The UV-VIS spectra of this freestanding film was measured and shown in FIG. 5. The transparency (% T) of >90% at 400-800 nm wavelength region that is closer to the maximum % T of about 92% that can be expected was obtained. The films generated by the methods described in this invention are therefore suitable for optical applications where highly transparent films are desired.

Examples 49-52

Pd785 (0.03 g) was dissolved in anhydrous THF (3.2 g) to prepare 1 wt. % solution. A portion of this solution (1.01 g) was mixed with distilled water (0.083 g) to form Pd785/water/THF mixture in a glass vial where the water content of the mixture was about 7.6 wt. % and sealed with a septum cap. LiFABA (0.174 g) was dissolved either in anhydrous THF (3.2 g) or anhydrous EA (3.2 g) to form LiFABA solutions at about 5 wt. % in glass vials and sealed with a septum cap. TD (1.92 g, 12 mmol) and BuNB (1.2 g, 8 mmol) were mixed in glass vials (TD/BuNB, 60/40 mole ratio). LiFABA (0.16 g) and Pd785 (0.16 g) solutions were added to these monomer mixtures. The molar ratio of monomer/Pd785/LiFABA of the compositions were maintained at about 10000/1/5 in all Examples irrespective of the catalyst delivery solvents used. Pd785 solutions containing water were used as either fresh with less than 1 hour after preparation (fresh) or after aging for 16 days (aged) to allow any transformation of the Pd785 due to reaction with water present in the medium. Small samples of the mixtures (about 0.8 g-1 g) were heated in glass vials at 110° C. and the time taken for the liquid mixtures to become solids (gel time) was noted for each mixture. The compositions of Examples 49-52 are summarized in Table 13, which includes Examples 18 and 20 where the Pd785/THF solution did not have any added water. The gel times clearly indicate an increase in polymerization efficiency when water was present in Pd785/THF catalyst delivery medium. The polymerization efficiency further increased when Pd785/THF/water mixture was aged. A comparison of DSC plots of Example 18 and Example 49 are shown in FIG. 6, which clearly demonstrates that the presence of water in the Pd785/THF catalyst delivery media accelerated the polymerization efficiency by shifting the onset of the exotherm to a lower temperature.

TABLE 13

| Example No. | Pd785 delivery media | LiFABA delivery media | Gel time | Exotherm |
|---|---|---|---|---|
| Example 18 | THF | THF | 1200 sec | 353 J/g |
| Example 49 | THF/water (fresh) | THF | 360 sec | 324 J/g |
| Example 50 | THF/water (aged) | THF | 180 sec | — |
| Example 20 | THF | EA | 600 sec | — |
| Example 51 | THF/water (fresh) | EA | 240 sec | — |
| Example 52 | THF/water (aged) | EA | 150 sec | — |

Examples 53-57

Shelf Life Studies

Pd785 was dissolved in various solvents (dichloromethane, toluene, xylenes or THF) to form 1 wt. % solutions. A portion of Pd785/THF solution (3 g) was mixed with distilled water (0.3 g, 10 wt. % water in the catalyst system) and aged at ambient temperature for 15 days. LiFABA was dissolved in anhydrous EA to form a 5 wt. % solution. HexNB (3.56 g, 20 mmol) was mixed with Pd785 solution (0.16 g) and LiFABA solution (0.1 g). The molar ratio of monomer/Pd785/LiFABA of each of the compositions was maintained at about 10000/1/3. These mixtures were kept at ambient temperature of about 23° C. and their viscosities were noted visually as not viscous (n. viscous), slightly viscous (s. viscous), viscous (v) or a gel to evaluate the shelf life of these compositions. All compositions were not viscous soon after preparation and remained as such for at least 1 day (24 hours) before viscosities begun to increase. Tables 15 and 16 summarize these observations. The shelf lives were deemed good if these mixtures could pour onto a substrate such as glass for forming films (i.e., not gelled). The shelf lives of the compositions are dependent on the Pd785 catalyst delivery solvent and modulated by the coordinating ability of the catalyst delivery solvents described as coordinating ability index (α) as a measure of the coordination ability of the solvent to transition metal (see Chem. Eur. J. 2020, 26, 4350-4377). Solvents with higher coordinating ability to a transition metal such as THF ($\alpha=-0.3$) had longer shelf life while solvents with lower coordination ability to a transition metal such as toluene ($\alpha=-1.3$) had shorter shelf life. Dichloromethane is commonly considered as a polar but noncoordinating solvent (see J. Am. Chem. Soc. 1998, 110, 5293) with an α value of −1.8 although it can coordinate to a transition metal due to the presence of lone pairs of electrons on the chlorine (J. Am. Chem. Soc. 1989, 111, 3762-3764). The shelf-life results shown in Table 14 suggests that dichloromethane acts as a non-coordinating solvent. Therefore, shelf lives of the compositions of this invention can be modulated by selecting a suitable Pd785 catalyst delivery solvent. The composition containing Pd785/THF/water was an exception suggesting that such catalyst system may have converted to a more active species in the presence of water during aging as described hereinabove.

About 1 g of the composition from each of Examples 53, 56 and 57 were heated on a hot plate to 120° C. in closed glass vials and the time taken for the mixtures to gel were noted. The composition of Example 53 gelled in 3 minutes and 30 seconds. The composition of Example 56 gelled in 5 minutes and the composition of Example 57 gelled in 3 minutes and 15 seconds demonstrating that the presence of water in the catalyst delivery medium increased the polymerization efficiency while decreasing the shelf life as shown in Table 14. The reactivity of the composition of Example 57 was similar to that of Example 53 and not that of Example 56 despite of the use of more coordinating THF in the catalyst delivery media for both Examples 56 and 57. The presence of water in the catalyst delivery media in Example 57 cannot make it less coordinating since water has a high coordinating ability to transition metals due to the presence of oxygen's lone pairs of electrons. The α value of water is set as zero in coordinating ability rankings making it more coordinating than THF to a transition metal. These catalytic activity differences must have arisen from the reaction of water with Pd785 generating more active catalyst species in situ. The catalytic activity of Pd785/THF/water (3 minutes and 15 seconds gel time of Example 57 at 120° C.) is comparable to that of Pd785/CH$_2$Cl$_2$ (3 minutes 30 seconds gel time in Example 53) but the shelf life of Example 57 is longer (at least twice as long) than that of Example 53 (see Table 15).

TABLE 14

| Example No. | Solvent | α rank | Day-0 | Week-3 | Week-4 | Week-7 |
|---|---|---|---|---|---|---|
| Example 55 | Xylenes | −0.5 | n. viscous | n. viscous | s. viscous | viscous |
| Example 56 | THF | −0.3 | n. viscous | n. viscous | n. viscous | n. viscous |

TABLE 15

| Example No. | Solvent | α rank | Day-2 | Day-3 | Day-4 | Day-7 |
|---|---|---|---|---|---|---|
| Example 53 | CH$_2$Cl$_2$ | −1.8 | viscous | gel | | |
| Example 54 | Toluene | −1.3 | n. viscous | n. viscous | s. viscous | viscous |
| Example 57 | THF/water | 0 to −0.3 | n. viscous | s. viscous | viscous | |

Example 58

The compositions of Examples 53, 55, 56 and 57 were spread on glass substrates by doctor blading technique to generate rectangular films at about 100-160 μm and cured at 130° C. for 2 hours under nitrogen atmosphere. Film of Example 53 was 115 μm thick; film of Example 55 was 110 μm thick; film of Example 56 was 160 μm thick; and film of Example 57 was 150 μm thick. Glass transition temperature (T$_g$) and coefficient of thermal expansion (CTE) were measured by thermo mechanical analysis (TMA), 5 wt. % decomposition temperature (T$_{d5}$) was measured by thermo gravimetric analysis (TGA) and tensile strength, Young's modulus, and elongation to break (ETB) were measured by Instron. Dielectric constant (Dk) and dielectric dissipation factor (Df) at 10 GHz frequency were also measured. Table 16 summarizes the results obtained. The results suggest that the films generated by using compositions to modulate their polymerization efficiency and shelf lives (i.e., when catalyst reactivity was altered by changing catalyst delivery solvent) generated films with improved thermo mechanical properties as well as low dielectric constant and low dielectric dissipation factor when sufficiently high polymerization temperature and longer reaction time was used. These examples clearly demonstrate the benefits obtained by the practice of this invention. It is important to note that as described herein modulation of the reactivity of the catalysts and the shelf lives of the compositions of this invention does not affect the thermal, mechanical, or electrical properties of the polymeric films formed therefrom.

TABLE 16

| Example No. | Dk | Df | CTE (ppm/K) | T$_g$ (° C.) | T$_{d5}$ (° C.) | Tensile Strength (MPa) | Young's Modulus (GPa) | ETB (%) |
|---|---|---|---|---|---|---|---|---|
| Example 53 | 2.28 | 0.00037 | 182 | 248 | 373 | 17 | 0.34 | 82 |
| Example 55 | 2.21 | 0.00040 | 176 | 242 | 376 | — | — | — |
| Example 56 | 2.30 | 0.00038 | 182 | 240 | 372 | 16 | 0.39 | 86 |
| Example 57 | 2.26 | 0.00027 | 207 | 235 | 374 | 23 | 0.53 | 88 |

Comparative Example 1

A mixture of TD (3.85 g, 24.0 mmol) and BuNB (2.4 g, 16 mmol) was made in a glass vial and used for the polymerization. To this mixture were added Pd785 (0.0031 g, 0.0039 mmol) and DANFABA (0.016 g, 0.02 mmol). The molar ratio of monomer/Pd785/DANFABA of the mixture was about 10250/1/5.1 that is similar to the catalyst loading used for Examples 14-17. Some powder settled in the bottom of the vial indicating that the catalyst and co-catalyst are not completely soluble in the absence of a catalyst delivery solvent. A sample of this composition was analyzed by DSC. About 1 g of this mixture was heated in an aluminum pan in air on a hot plate at 110° C. for 3 hours. The weight of the material was measured before and after curing to determine the fraction of weight loss. Likewise, about 2 g of the mixture was heated in a closed glass vial at 110° C. The time taken for the liquid mixture to become a gel (gel-time) was noted. The results are listed in Table 3.

Comparative Example 2

A mixture of TD (3.85 g, 24 mmol) and BuNB (2.4 g, 16 mmol) was made in a glass vial and used for the polymerization. To this mixture were added Pd785 (0.0031 g, 0.0039 mmol) and LiFABA (0.017 g, 0.02 mmol). The molar ratio of monomer/Pd785/LiFABA of the mixture was about 10250/1/5.1 that is similar to the catalyst loading used for Examples 18-22. Some powder settled in the bottom of the vial indicating that the catalyst and co-catalyst were not completely soluble in the absence of a catalyst delivery solvent. A sample of this composition was analyzed by DSC. About 1 g of this mixture was heated in an aluminum pan in air on a hot plate at 110° C. for 3 hours. The weight of the material was measured before and after curing to determine the fraction of weight loss. Likewise, about 2 g of the mixture was heated in closed glass vial at 110° C. The time taken for the liquid mixture to become a gel (gel-time) was noted. The results are listed in Table 4.

Comparative Example 3

Pd785 (0.031 g, 0.039 mmol) was dissolved in about 3.2 g TESNB as the catalyst delivery medium. DANFABA (0.174 g, 0.22 mmol) was dissolved in 3.2 g of TESNB as the co-catalyst delivery medium. TD (1.6 g, 9.98 mmol), BuNB (1.2 g, 7.98 mmol) and TESNB (0.24 g, 1.11 mmol) were mixed in a glass vial and Pd785 in TESNB (0.16 g) and DANFABA in TESNB (0.14 g) added. The mixture had total TESNB amount of 0.54 g (1.99 mmol). The mole ratio of TD/BuNB/TESNB mixture was 50/40/10. About 1 g of this mixture was heated in an aluminum pan in air on a hot plate at 110° C. for 3 hours. The weight of the material was measured before and after curing to determine the fraction of weight loss of 18%. Likewise, about 2 g of the mixture was heated in closed glass vial at 110° C. The time taken for the liquid mixture to become a gel (gel-time) was noted as 150 seconds. This comparative example 3 shows that a polar monomer such as TESNB can be used as the catalyst delivery medium in lieu of catalyst delivery solvents. The properties measured for TD/BUNB/TESNB (50/40/10) film prepared using MCH to deliver Pd785 and EA to deliver DANFABA are listed in Table 9. Although glass transition temperature and CTE are not adversely affected by the introduction of a polar monomer such as TESNB that can replace MCH and EA, the dielectric loss factor (Df) is significantly higher (0.0082) for this composition. This demonstrates that polar monomers that are capable of dissolving catalyst or co-catalyst components are not necessarily beneficial for other properties such as dielectric loss factor.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A film forming composition comprising:
   a) one or more olefinic monomers selected from the group consisting of:

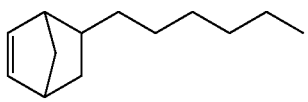

2-hexyl-1,2,3,4,4a,5,8,8a-octahydro-1,4:5,8-dimethanonaphthalene (HexTD);

tetracyclododecene (TD);

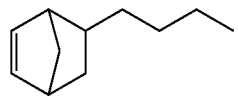

5-butylbicyclo[2.2.1]hept-2-ene (BuNB);

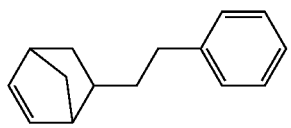 [SMILES: C1=CC2CC1CC2CCc1ccccc1]

5-phenethylbicyclo[2.2.1]hept-2-ene (PENB);

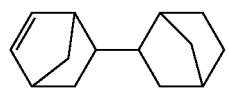 [SMILES: C1=CC2CC1CC2C1CC2CCC1C2]

2,2'-bi(bicyclo[2.2.1]heptan-5-ene (NBANB);

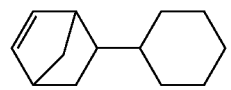 [SMILES: C1=CC2CC1CC2C1CCCCC1]

5-cyclohexylbicyclo[2.2.1]hept-2-ene (CyHexNB);

bicyclo[2.2.1]hepta-2,5-diene (NBD); and

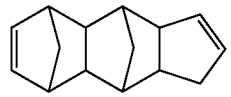 [SMILES: C1=CC2C(C1)C1CC2C2C3C=CC(C3)C12]

3a,4,4a,5,8,8a,9,9a-octahydro-1H-4,9:5,8-dimethanocyclopenta[b]naphthalene (CPD3);

b) an organopalladium compound selected from the group consisting of:
   palladium (II) bis(tricyclohexylphosphine) dichloride;
   palladium (II) bis(tricyclohexylphosphine) dibromide;
   palladium (II) bis(tricyclohexylphosphine) diacetate (Pd785); and
   palladium (II) bis(tricyclohexylphosphine) bis(trifluoroacetate); and c) an activator selected from the group consisting of:
   tolylcumyliodonium-tetrakis pentafluorophenylborate;
   4,4'-di-($C_{10}$-$C_{13}$) alkyldiphenyl iodonium tetrakis(2,3,4,5,6-pentafluorophenyl) borate;
   lithium tetrakis(pentafluorophenyl)borate etherate (Li-FABA); and
   dimethylanilinium tetrakis(pentafluorophenyl)borate (DANFABA); and d) a solvent selected from the group consisting of water, toluene, trifluorotoluene, tetrahydrofuran, ethyl acetate, cyclohexane, methylcyclohexane, and a mixture in any combination thereof; and wherein the composition exhibits shelf life stability from about one hour up to seven weeks at about 25° C. and undergoes mass polymerization only when subjected to a suitable temperature above 100° C.

2. The film forming composition according to claim 1, which further comprises a compound selected from the group consisting of:
   a compound of formula (A1):

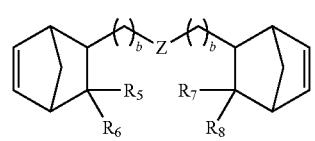

(A1)

wherein:

b is an integer from 2 to 6;

Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched ($C_3$-$C_6$) alkyl;

$R_5$, $R_6$, $R_7$ and $R_8$ are the same or different and each independently of one another selected from the group consisting of hydrogen, methyl, ethyl and linear or branched ($C_3$-$C_{16}$) alkyl; and a compound of formula (A2):

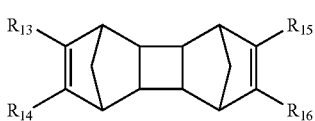

(A2)

wherein $R_{13}$, $R_{14}$, $R_{15}$ and $R_{16}$ are the same or different and each independently of one another selected from the group consisting of hydrogen, methyl, ethyl and linear or branched ($C_3$-$C_{16}$)alkyl.

3. The film forming composition according to claim 1, wherein the monomer is selected from the group consisting of:

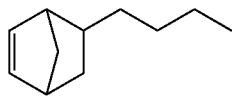

5-butylbicyclo[2.2.1]hept-2-ene (BuNB);

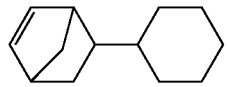 [SMILES: C1=CC2CC1CC2C1CCCCC1]

5-cyclohexylbicyclo[2.2.1]hept-2-ene (CyHexNB);

1,2,3,4,4a,5,8,8a-octahydro-1,4:5,8-dimethanonaphthalene (TD);

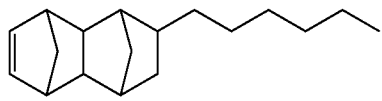 [SMILES: CCCCCCC1CC2CC1C1C3C=CC(C3)C21]

2-hexyl-1,2,3,4,4a,5,8,8a-octahydro-1,4:5,8-dimethanonaphthalene (HexTD);

and

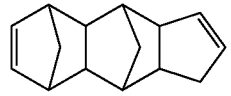 [SMILES: C1=CC2C(C1)C1CC2C2C3C=CC(C3)C12]

3a,4,4a,5,8,8a,9,9a-octahydro-1H-4,9:5,8-dimethanocyclopenta[b]naphthalene (CPD3).

4. The film forming composition according to claim 2, wherein the compound of formula (A1) is selected from the group consisting of:

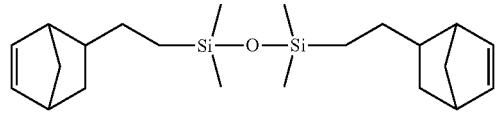 [SMILES: C[Si](C)(CCC1CC2C=CC1C2)O[Si](C)(C)CCC1CC2C=CC1C2]

1,3-bis(2-(bicyclo[2.2.1]hept-5-en-2-yl) ethyl)-1,1,3,3-tetramethyldisiloxane (NBC2DMSC2NB); and

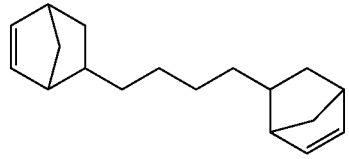 [SMILES: C1=CC2CC1CC2CCCCC1CC2C=CC1C2]

1,4-di(bicyclo[2.2.1]hept-5-en-2-yl)butane (NBC4NB).

5. The film forming composition according to claim 2, wherein the compound of formula (A2) is:

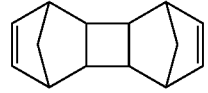 [SMILES: C1=CC2CC1C1C2C2C3C=CC(C3)C12]

1,4,4a,4b,5,8,8a,8b-octahydro-1,4:5,8-dimethanobiphenylene ((NBD)2).

6. The film forming composition according to claim 1, which further comprises an inorganic filler.

7. The film forming composition according to claim 1, which is selected from the group consisting of:
2-hexyl-1,2,3,4,4a,5,8,8a-octahydro-1,4:5,8-dimethanonaphthalene (HexTD), palladium (II) bis(tricyclohexylphosphine) diacetate (Pd785) and dimethylanilinium tetrakis(pentafluorophenyl)borate (DANFABA);
1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and lithium tetrakis(pentafluorophenyl)borate etherate (LiFABA);
2,2'-bi(bicyclo[2.2.1]heptan-5-ene (NBANB), palladium (II) bis(tricyclohexylphosphine) diacetate (Pd785) and dimethylanilinium tetrakis(pentafluorophenyl)borate (DANFABA);
5-cyclohexylbicyclo[2.2.1]hept-2-ene (CyHexNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), palladium (II) bis(tricyclohexylphosphine) diacetate (Pd785) and dimethylanilinium tetrakis(pentafluorophenyl)borate (DANFABA);

5-phenethylbicyclo[2.2.1]hept-2-ene (PENB), palladium (II) bis(tricyclohexylphosphine) diacetate (Pd785) and lithium tetrakis(pentafluorophenyl)borate etherate (Li-FABA);

5-butylbicyclo[2.2.1]hept-2-ene (BuNB), palladium (II) bis(tricyclohexylphosphine) diacetate (Pd785) and tolylcumyliodonium-tetrakis pentafluorophenylborate;

5-butylbicyclo[2.2.1]hept-2-ene (BuNB), palladium (II) bis(tricyclohexylphosphine) diacetate (Pd785) and 4,4'-di-($C_{10}$-$C_{13}$)alkyldiphenyl iodonium tetrakis(2,3,4,5,6-pentafluorophenyl) borate;

5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA); and 5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA).

8. A kit for forming a film comprising a composition comprising:

a) one or more olefinic monomers of formula (I) selected from the group consisting of:

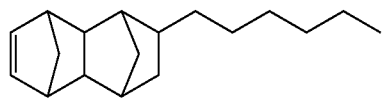 [SMILES: CCCCCCC1CC2CC1C1C3C=CC(C3)C21]

2-hexyl-1,2,3,4,4a,5,8,8a-octahydro-1,4:5,8-dimethanonaphthalene (HexTD);

tetracyclododecene (TD);

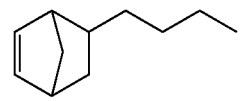

5-butylbicyclo[2.2.1]hept-2-ene (BuNB);

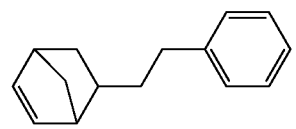

5-phenethylbicyclo[2.2.1]hept-2-ene (PENB);

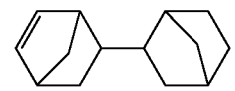

2,2'-bi(bicyclo[2.2.1]heptan-5-ene (NBANB);

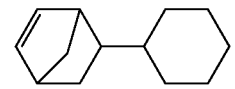

5-cyclohexylbicyclo[2.2.1]hept-2-ene (CyHexNB);

bicyclo[2.2.1]hepta-2,5-diene (NBD); and

3a,4,4a,5,8,8a,9,9a-octahydro-1H-4,9:5,8-dimethanocyclopenta[b]naphthalene (CPD3);

b) an organopalladium compound selected from the group consisting of:
   palladium (II) bis(tricyclohexylphosphine) dichloride;
   palladium (II) bis(tricyclohexylphosphine) dibromide;
   palladium (II) bis(tricyclohexylphosphine) diacetate (Pd785); and
   palladium (II) bis(tricyclohexylphosphine) bis(trifluoroacetate); and c) an activator selected from the group consisting of:
   tolylcumyliodonium-tetrakis pentafluorophenylborate;
   4,4'-di-($C_{10}$-$C_{13}$)alkyldiphenyl iodonium tetrakis(2,3,4,5,6-pentafluorophenyl)borate;
   lithium tetrakis(pentafluorophenyl)borate etherate (Li-FABA); and
   dimethylanilinium tetrakis(pentafluorophenyl)borate (DANFABA); and d) a solvent selected from the group consisting of water, toluene, trifluorotoluene, tetrahydrofuran, ethyl acetate, cyclohexane, methylcyclohexane, and a mixture in any combination thereof; and wherein the composition exhibits shelf life stability from about one hour up to seven weeks at about 25° C. and undergoes mass polymerization only when subjected to a suitable temperature above 100° C.

9. The kit according to claim 8, wherein the monomer is selected from the group consisting of:

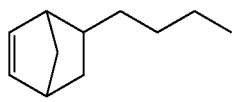

5-butylbicyclo[2.2.1]hept-2-ene (BuNB);

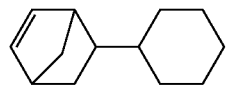 [SMILES: C1=CC2CC1CC2C1CCCCC1]

5-cyclohexylbicyclo[2.2.1]hept-2-ene (CyHexNB);

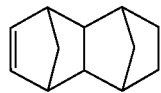

1,2,3,4,4a,5,8,8a-octahydro-1,4:5,8-dimethanonaphthalene (TD);

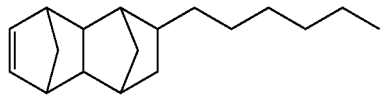 [SMILES: CCCCCCC1CC2CC1C1C3C=CC(C3)C21]

2-hexyl-1,2,3,4,4a,5,8,8a-octahydro-1,4:5,8-dimethanonaphthalene (HexTD);
and

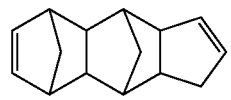 [SMILES: C1=CC2C(C1)C1CC2C2C3C=CC(C3)C12]

3a,4,4a,5,8,8a,9,9a-octahydro-1H-4,9:5,8-dimethanocyclopenta[b]naphthalene (CPD3).

10. The kit according to claim 8, which further comprises:
a compound selected from the group consisting of:
a compound of formula (A1):

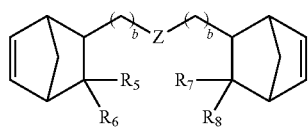

(A1)

wherein:
b is an integer from 2 to 6;
Z is a bond or $R_9R_{10}SiOSiR_{11}R_{12}$, where each of $R_9$, $R_{10}$, $R_{11}$ and $R_{12}$ are the same or different and each independently of one another selected from the group consisting of methyl, ethyl and linear or branched $(C_3$-$C_6)$alkyl;
$R_5$, $R_6$, $R_7$ and $R_8$ are the same or different and each independently of one another selected from the group consisting of hydrogen, methyl, ethyl and linear or branched $(C_3$-$C_{16})$ alkyl; and
a compound of formula (A2):

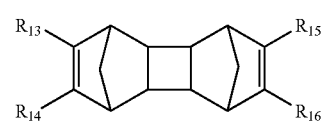

(A2)

wherein
$R_{13}$, $R_{14}$, $R_{15}$ and $R_{16}$ are the same or different and each independently of one another selected from the group consisting of hydrogen, methyl, ethyl and linear or branched $(C_3$-$C_{16})$alkyl.

11. The kit according to claim 10, wherein the compound of formula (A1) is selected from the group consisting of:

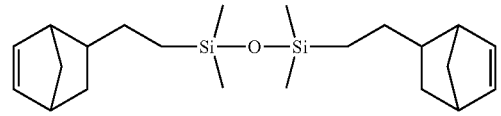 [SMILES: C[Si](C)(CCC1CC2C=CC1C2)O[Si](C)(C)CCC1CC2C=CC1C2]

1,3-bis(2-(bicyclo[2.2.1]hept-5-en-2-yl)ethyl)-1,1,3,3-tetramethyldisiloxane (NBC2DMSC2NB); and

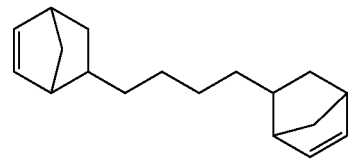 [SMILES: C1=CC2CC1CC2CCCCC1CC2C=CC1C2]

1,4-di(bicyclo[2.2.1]hept-5-en-2-yl)butane (NBC4NB).

12. The kit according to claim 10, wherein the compound of formula (A2) is:

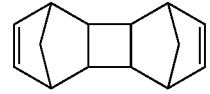

1,4,4a,4b,5,8,8a,8b-octahydro-1,4:5,8-dimethanobiphenylene ((NBD)2).

13. The kit according to claim 8, which further comprises an inorganic filler.

14. The kit according to claim 8, which is selected from the group consisting of:
2-hexyl-1,2,3,4,4a,5,8,8a-octahydro-1,4:5,8-dimethanonaphthalene (HexTD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and lithium tetrakis(pentafluorophenyl)borate etherate (LiFABA);

2,2'-bi(bicyclo[2.2.1]heptan-5-ene (NBANB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), palladium (II) bis(tricyclohexylphosphine) diacetate (Pd785) and dimethylanilinium tetrakis(pentafluorophenyl)borate (DANFABA);

5-phenethylbicyclo[2.2.1]hept-2-ene (PENB), palladium (II) bis(tricyclohexylphosphine) diacetate (Pd785) and lithium tetrakis(pentafluorophenyl)borate etherate (LiFABA);

5-butylbicyclo[2.2.1]hept-2-ene (BuNB), palladium (II) bis(tricyclohexylphosphine) diacetate (Pd785) and tolylcumyliodonium-tetrakis pentafluorophenylborate;

5-butylbicyclo[2.2.1]hept-2-ene (BuNB), palladium (II) bis(tricyclohexylphosphine) diacetate (Pd785) and 4,4'-di-($C_{10}$-$C_{13}$)alkyldiphenyl iodonium tetrakis(2,3,4,5,6-pentafluorophenyl)borate;

5-cyclohexylbicyclo[2.2.1]hept-2-ene (CyHexNB), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

5-cyclohexylbicyclo[2.2.1]hept-2-ene (CyHexNB), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), palladium (II) bis(tricyclohexylphosphine) diacetate (Pd785) and dimethylanilinium tetrakis(pentafluorophenyl)borate (DANFABA);

1,2,3,4,4a,5,8,8a-octahydro-1,4:5,8-dimethanonaphthalene (TD), 5-butylbicyclo[2.2.1]hept-2-ene (BuNB), bicyclo[2.2.1]hepta-2,5-diene (NBD), palladium (II) bis(tricyclohexylphosphine) diacetate (Pd785) and dimethylanilinium tetrakis(pentafluorophenyl)borate (DANFABA); and 5-cyclohexylbicyclo[2.2.1]hept-2-ene (CyhexNB), 5-butylbicyclo[2.2.1]hept-2-ene (BuNB), 3a,4,4a,5,8,8a,9,9a-octahydro-1H-4,9:5,8-dimethanocyclopenta[b]naphthalene (CPD3), palladium (II) bis(tricyclohexylphosphine) diacetate (Pd785) and dimethylanilinium tetrakis(pentafluorophenyl)borate (DANFABA).

\* \* \* \* \*